US010937596B2

(12) United States Patent
Onodera et al.

(10) Patent No.: US 10,937,596 B2
(45) Date of Patent: Mar. 2, 2021

(54) ELECTRONIC COMPONENT

(71) Applicant: TDK CORPORATION, Tokyo (JP)

(72) Inventors: Shinya Onodera, Tokyo (JP); Takehisa Tamura, Tokyo (JP); Ken Morita, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 16/750,050

(22) Filed: Jan. 23, 2020

(65) Prior Publication Data

US 2020/0251283 A1  Aug. 6, 2020

(30) Foreign Application Priority Data

Feb. 6, 2019  (JP) .............................. JP2019-019533
Feb. 6, 2019  (JP) .............................. JP2019-019536

(51) Int. Cl.
*H01G 4/248* (2006.01)
*H01G 4/30* (2006.01)
*H01G 4/232* (2006.01)
*H01G 4/12* (2006.01)

(52) U.S. Cl.
CPC ........... *H01G 4/248* (2013.01); *H01G 4/2325* (2013.01); *H01G 4/30* (2013.01); *H01G 4/1227* (2013.01)

(58) Field of Classification Search
None
See application file for complete search history.

(56) References Cited

U.S. PATENT DOCUMENTS

| 10,650,971 B2 * | 5/2020 | Jung ...................... H01G 4/232 |
| 2004/0084131 A1 * | 5/2004 | Konoue .................. B32B 18/00 156/89.11 |
| 2016/0351332 A1 * | 12/2016 | Lee .......................... H01G 4/30 |
| 2019/0304683 A1 * | 10/2019 | Terashita ............... H01G 2/065 |
| 2020/0211774 A1 * | 7/2020 | Onodera .............. H01G 4/2325 |
| 2020/0211775 A1 * | 7/2020 | Onodera .............. H01G 4/2325 |

* cited by examiner

*Primary Examiner* — Dion Ferguson
(74) *Attorney, Agent, or Firm* — Oliff PLC

(57) ABSTRACT

An electronic component includes an element body including a plurality of side surfaces adjacent to each other, and an external electrode disposed on the plurality of side surfaces. The external electrode includes a conductive resin layer in which a plurality of gaps exists and a plating layer disposed on the conductive resin layer. A clearance communicating with the plurality of gaps exists between an end edge of the plating layer and the element body. The conductive resin layer includes a first portion located on one side surface of the plurality of side surfaces and a second portion located on another side surface of the plurality of side surfaces. An existence ratio of the gaps in the first portion is greater than an existence ratio of the gaps in the second portion.

15 Claims, 15 Drawing Sheets

ELECTRONIC COMPONENT

BACKGROUND OF THE INVENTION

1. Field of the Invention

The present invention relates to an electronic component.

2. Description of Related Art

Known electronic components include an element body and an external electrode disposed on the element body (see, for example, Japanese Unexamined Patent Publication No. H05-144665). The element body includes a plurality of surfaces adjacent to each other. The external electrode is disposed on the plurality of surfaces. The external electrode includes a conductive resin layer and a plating layer disposed on the conductive resin.

SUMMARY OF THE INVENTION

The conductive resin layer is generally formed on a base and contains a resin and conductive metal particles. The base includes, for example, a sintered metal layer or an element body. The resin tends to absorb moisture. In a case in which the electronic component is solder-mounted on an electronic device, the moisture absorbed by the resin may be gasified so that volume expansion may occur. In this case, stress may act on the conductive resin layer, and the conductive resin layer tends to be peeled off from the base. The electronic device includes, for example, a circuit board or an electronic component.

An object of an aspect of the present invention is to provide an electronic component that suppresses peel-off of a conductive resin layer.

An electronic component according to a first aspect of the present invention includes an element body including a plurality of side surfaces adjacent to each other, and an external electrode disposed on the plurality of side surfaces. The external electrode includes a conductive resin layer in which a plurality of gaps exists and a plating layer disposed on the conductive resin layer. A clearance communicating with the plurality of gaps exists between an end edge of the plating layer and the element body. The conductive resin layer includes a first portion located on one side surface of the plurality of side surfaces and a second portion located on another side surface of the plurality of side surfaces. An existence ratio of the gaps in the first portion is greater than an existence ratio of the gaps in the second portion.

In the first aspect, even in the case in which moisture absorbed in the resin is gasified when the electronic component is solder-mounted, gas generated from the moisture reaches the clearance between the end edge of the plating layer and the element body from the plurality of gaps. The gas reaching the clearance between the end edge of the plating layer and the element body moves out of the external electrode. Therefore, stress tends not to act on the conductive resin layer. Consequently, the first aspect suppresses peel-off of the conductive resin layer.

In the configuration in which the existence ratio of gaps in the first portion is greater than the existence ratio of gaps in the second portion, the gas generated from the moisture in the conductive resin layer tends to move out of the external electrode through a clearance between an end edge of a portion of the plating layer located on the first portion and the element body. The gas tends not to move from the clearance between the end edge of the portion of the plating layer located on the second portion and the element body. Therefore, in the first aspect, the gas moves out of the external electrode mainly through the clearance between the end edge of the portion of the plating layer located on the first portion and the element body. Consequently, the first aspect controls a position where the gas exits.

In the first aspect, a maximum thickness of the first portion may be larger than a maximum thickness of the second portion. In this case, a movement path of the gas in the first portion increases, and the gas tends to move through the first portion. Therefore, the gas tends to move out of the external electrode through the clearance between the portion of the plating layer located on the first portion and the element body. Consequently, the stress further tends not to act on the conductive resin layer in this configuration, and this configuration further suppresses the peel-off of the conductive resin layer.

In the first aspect, a total area of the gaps in the first portion may be within a range of 5 to 35% of an area of the first portion in a cross-section along a thickness direction of the first portion.

In a case in which the total area of the gaps in the first portion is smaller than 5% of the area of the first portion in the cross-section along the thickness direction of the first portion, the gas generated from the moisture tends not to move inside the gap. In a case in which the total area of the gaps in the first portion is larger than 35% of the area of the first portion in the cross-section along the thickness direction of the first portion, moisture tends to enter the conductive resin layer, and the gas generation amount may increase. Therefore, this configuration controls an increase in the gas generation amount and reduces inhibition of gas movement in the first portion.

In the first aspect, the one side surface may be arranged to constitute a mounting surface.

In a case in which the electronic component is solder-mounted on the electronic device, external force applied onto the electronic component from the electronic device may act as stress on the element body. The external force acts on the element body through the external electrode from the solder fillet formed at the solder-mounting. In this case, a crack may occur in the element body. For example, the external force tends to act on the surface arranged to constitute the mounting surface, in the element body.

Since the first portion is located on the one side surface arranged to constitute the mounting surface in this configuration, the external force applied onto the electronic component from the electronic device tends not to act on the element body. In a case in which the existence ratio of the gaps in the first portion is greater than the existence ratio of the gaps in the second portion, the first portion tends to mitigate the external force applied onto the element body as compared with the second portion. Therefore, this configuration reliably controls occurrence of the crack in the element body.

In the first aspect, the other side surface may be arranged to constitute a mounting surface.

In a case in which the gas generated from the moisture in the conductive resin layer moves out of the external electrode through the clearance between the end edge of the portion of the plating layer located on the second portion and the element body, a posture of the electronic component may change during solder-mounting due to ejection of the gas from the external electrode. In a case in which the posture of the electronic component changes, a mounting failure of the electronic component may occur.

In a case in which the existence ratio of gaps in the first portion is greater than the existence ratio of gaps in the second portion, the gas moves out of the external electrode mainly through the clearance between the end edge of the portion of the plating layer located on the first portion and the element body, as described above. Therefore, this configuration controls occurrence of the mounting failure of the electronic component.

In the first aspect, the element body may include an end surface adjacent to the plurality of side surfaces. The conductive resin layer may be formed to continuously cover a part of each of the plurality of side surfaces and a part of the end surface. The plating layer may be formed to cover the entire end surface.

For example, the external force also tends to act on a region in the element body, the region being defined by the part of each of the plurality of side surfaces and the part of the end surface. Since the conductive resin layer continuously covers the part of each of the plurality of side surfaces and the part of the end surface in this configuration, the external force applied onto the electronic component from the electronic device tends not to act on the element body. Therefore, this configuration controls the occurrence of the crack in the element body.

Since the plating layer is formed to cover the entire end surface, a clearance tends not to exist between the plating layer and the end surface. Therefore, the gas generated in the portion of the conductive resin layer located on the end surface moves to the first portion, and passes through the clearance between the end edge of the portion located on the first portion and the element body, and moves out of the external electrode. Consequently, this configuration reliably controls the position where the gas exits.

In the first aspect, the element body may include an end surface adjacent to the plurality of side surfaces. The one of the side surfaces may be arranged to constitute a mounting surface. The conductive resin layer may be formed to continuously cover a part of each of the plurality of side surfaces and a part of the end surface. The plating layer may be formed to cover the entire end surface. An area of the first portion may be larger than an area of the second portion.

Since the first portion is located on the one side surface constituting the mounting surface in this configuration, the external force applied onto the electronic component from the electronic device tends not to act on the element body as described above. In the configuration in which the area of the first portion is larger than the area of the second portion, the external force applied onto the electronic component from the electronic device tends not to act on the element body, as compared with in the configuration in which the area of the first portion is smaller than the area of the second portion. Since the existence ratio of the gaps in the first portion is greater than the existence ratio of the gaps in the second portion, the first portion tends to mitigate the external force applied onto the element body as compared with the second portion as described above. Therefore, this configuration more reliably controls the occurrence of the crack in the element body.

In the first aspect, a maximum length of each of the plurality of gaps may be within a range of 1 to 20 µm in a cross-section along a thickness direction of the conductive resin layer.

In a case in which the maximum length of each of the plurality of gaps is smaller than 1 µm in the cross-section along the thickness direction of the conductive resin layer, the gas generated from the moisture may tend not to move inside the gap. In a case in which the maximum length of each of the plurality of gaps is larger than 20 µm in the cross-section along the thickness direction of the conductive resin layer, moisture may tend to remain in the conductive resin layer and the gas generation amount may increase. Therefore, this configuration controls an increase in the gas generation amount, and reduces inhibition of gas movement in the conductive resin layer.

An electronic component according to a second aspect of the present invention includes an element body and an external electrode disposed on the element body. The external electrode includes a conductive resin layer in which a plurality of gaps exists and a plating layer disposed on the conductive resin layer. A clearance communicating with the plurality of gaps exists between an end edge of the plating layer and the element body.

In the second aspect, gas generated from moisture reaches the clearance between the end edge of the plating layer and the element body from the plurality of gaps even in the case where the moisture absorbed in the resin is gasified when the electronic component is solder-mounted. The gas reaching the clearance between the end edge of the plating layer and the element body moves out of the external electrode. Therefore, stress tends not to act on the conductive resin layer. Consequently, the second aspect suppresses peel-off of the conductive resin layer.

An electronic component according to a third aspect of the present invention includes an element body including a side surface and an end surface adjacent to each other, and an external electrode disposed on the side surface and the end surface. The external electrode includes a conductive resin layer in which a plurality of gaps exists and a plating layer disposed on the conductive resin layer. A clearance communicating with the plurality of gaps exists between an end edge of the plating layer and the element body. The conductive resin layer includes a first portion located on the side surface and a second portion located on the end surface. An existence ratio of the gaps in the first portion is greater than an existence ratio of the gaps in the second portion.

In the third aspect, gas generated from moisture reaches the clearance between the end edge of the plating layer and the element body from the plurality of gaps even in the case where the moisture absorbed in the resin is gasified when the electronic component is solder-mounted. The gas reaching the clearance between the end edge of the plating layer and the element body moves out of the external electrode. Therefore, stress tends not to act on the conductive resin layer. Consequently, the third aspect suppresses peel-off of the conductive resin layer.

In the configuration in which the existence ratio of gaps in the first portion is greater than the existence ratio of gaps in the second portion, the gas generated from the moisture in the conductive resin layer tends to move out of the external electrode through the clearance between the portion of the plating layer located on the first portion and the element body. The gas generated in the second portion tends to reach the first portion through a passage constituted by the plurality of gaps. As described above, the gas reaching the first portion moves out of the external electrode through the clearance between the end edge of the plating layer and the element body. Therefore, the third aspect controls the position where the gas exits.

When the electronic component is solder-mounted, more molten solder exists at a position corresponding to the end surface than at a position corresponding to the side surface. Therefore, solder splattering may occur at the position corresponding to the end surface. The solder splattering is a phenomenon in which molten solder is blown away by the gas exiting from the external electrode when the electronic component is solder-mounted on the electronic device.

Since the gas generated in the second portion tends to reach the first portion in the third aspect as described above, the gas moves out of the external electrode through the clearance from the first portion. Therefore, the third aspect controls occurrence of the solder splattering.

In the third aspect, a maximum thickness of the first portion may be larger than a maximum thickness of the second portion. In this case, a movement path of the gas in the first portion increases, and the gas tends to move through the first portion. Therefore, the gas tends to move out of the external electrode through the clearance between the portion of the plating layer located on the first portion and the element body. Consequently, the stress further tends not to act on the conductive resin layer in this configuration, and this configuration further suppresses the peel-off of the conductive resin layer. This configuration further controls occurrence of the solder splattering.

In the third aspect, a total area of the gaps in the first portion may be within a range of 5 to 35% of an area of the first portion in a cross-section along a thickness direction of the first portion.

In a case in which the total area of the gaps in the first portion is smaller than 5% of the area of the first portion in the cross-section along the thickness direction of the first portion, the gas generated from the moisture tends not to move inside the gap. In a case in which the total area of the gaps in the first portion is larger than 35% of the area of the first portion in the cross-section along the thickness direction of the first portion, moisture tends to enter the conductive resin layer, and the gas generation amount may increase. Therefore, this configuration controls an increase in the gas generation amount and reduces inhibition of gas movement in the first portion.

In the third aspect, the side surface may be arranged to constitute a mounting surface.

In a case in which the electronic component is solder-mounted on the electronic device, external force applied onto the electronic component from the electronic device may act as stress on the element body. The external force acts on the element body through the external electrode from the solder fillet formed at the solder-mounting. In this case, a crack may occur in the element body. For example, the external force tends to act on the surface arranged to constitute the mounting surface, in the element body.

Since the first portion is located on the side surface arranged to constitute the mounting surface in this configuration, the external force applied onto the electronic component from the electronic device tends not to act on the element body. In a case in which the existence ratio of the gaps in the first portion is greater than the existence ratio of the gaps in the second portion, the first portion tends to mitigate the external force applied onto the element body as compared with the second portion. Therefore, this configuration reliably controls occurrence of the crack in the element body.

In the third aspect, the conductive resin layer may be formed to continuously cover a part of the side surface and a part of the end surface. The plating layer may be formed to cover the entire end surface.

For example, the external force also tends to act on a region in the element body, the region being defined by the part of the side surface and the part of the end surface. Since the conductive resin layer continuously covers the part of the side surface and the part of the end surface in this configuration, the external force applied onto the electronic component from the electronic device tends not to act on the element body. Therefore, this configuration controls the occurrence of the crack in the element body.

Since the plating layer is formed to cover the entire end surface, a clearance tends not to exist between the plating layer and the end surface. Therefore, the gas generated in the second portion moves to the first portion and moves out of the external electrode through the clearance between the portion located on the first portion and the element body. Consequently, this configuration reliably controls the position where the gas exits and reliably controls the occurrence of the solder splattering.

In the third aspect, a maximum length of each of the plurality of gaps may be within a range of 1 to 20 μm in a cross-section along a thickness direction of the conductive resin layer.

In a case in which the maximum length of each of the plurality of gaps is smaller than 1 μm in the cross-section along the thickness direction of the conductive resin layer, the gas generated from the moisture may tend not to move inside the gap. In a case in which the maximum length of each of the plurality of gaps is larger than 20 μm in the cross-section along the thickness direction of the conductive resin layer, moisture may tend to remain in the conductive resin layer and the gas generation amount may increase. Therefore, this configuration controls an increase in the gas generation amount, and reduces inhibition of gas movement in the conductive resin layer.

The present invention will become more fully understood from the detailed description given hereinafter and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating embodiments of the invention, are given by way of illustration only, since various changes and modifications within the spirit and scope of the invention will become apparent to those skilled in the art from this detailed description.

DETAILED DESCRIPTION OF EMBODIMENTS

Figure 1:
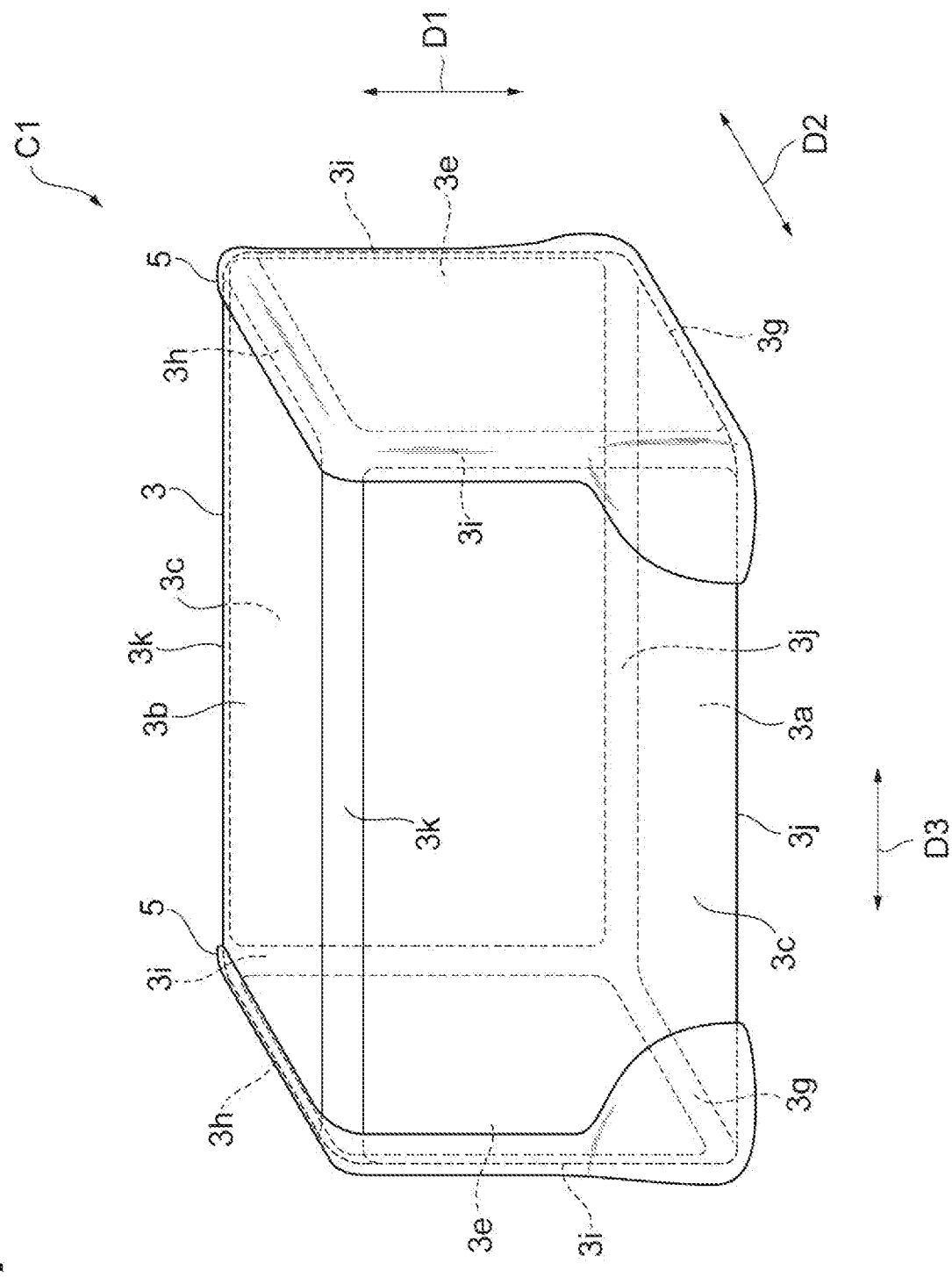
FIG. 1 is a perspective view of a multilayer capacitor according to an embodiment.

Hereinafter, embodiments of the present invention will be described in detail with reference to the accompanying drawings. In the following description, the same elements or elements having the same functions are denoted with the same reference numerals and overlapped explanation is omitted.

Figure 2:
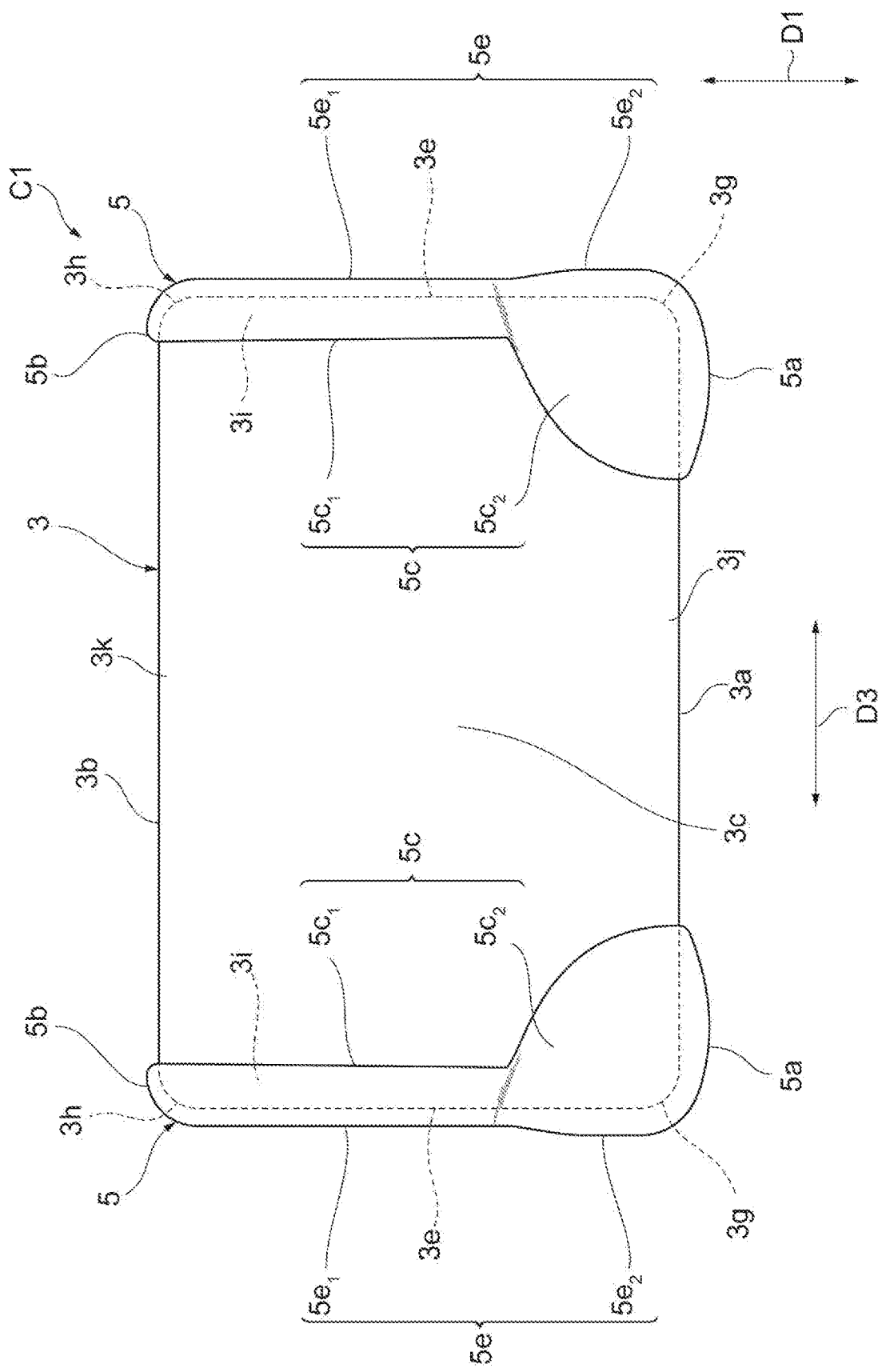
FIG. 2 is a side view of the multilayer capacitor according to the embodiment.
Figure 3:
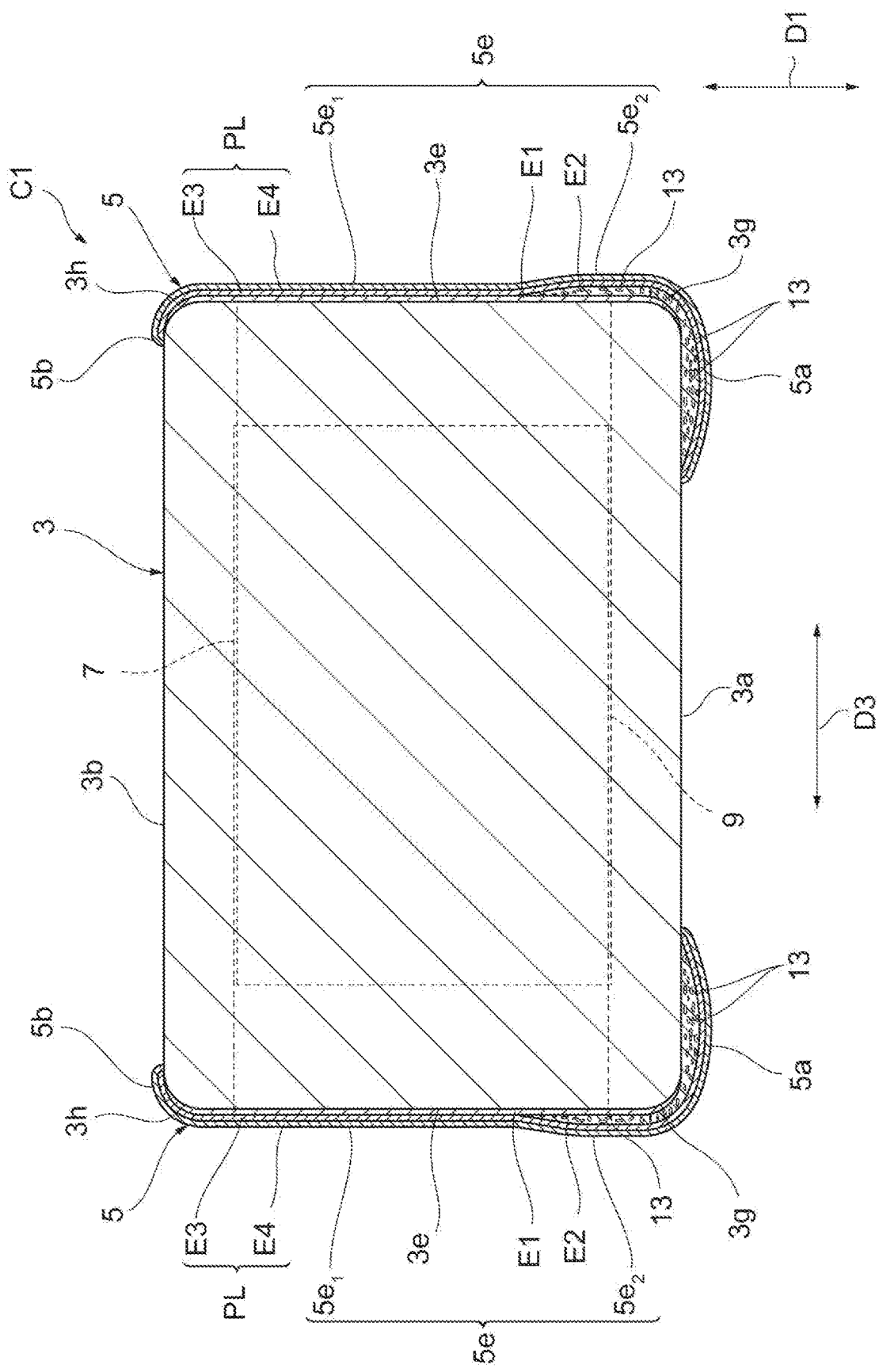
FIG. 3 is a view illustrating a cross-sectional configuration of the multilayer capacitor according to the embodiment.
Figure 4:
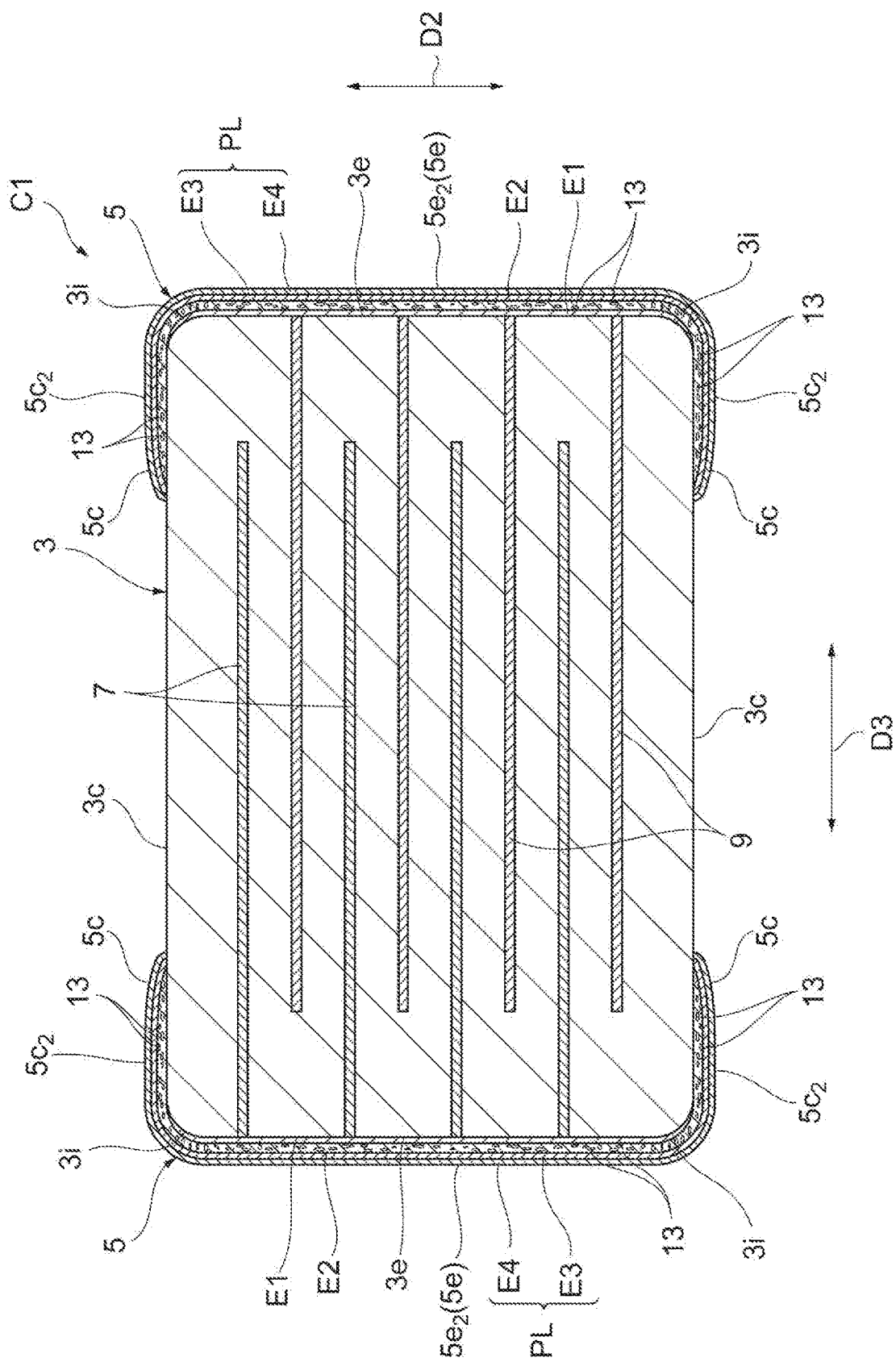
FIG. 4 is a view illustrating a cross-sectional configuration of the multilayer capacitor according to the embodiment.
Figure 5:
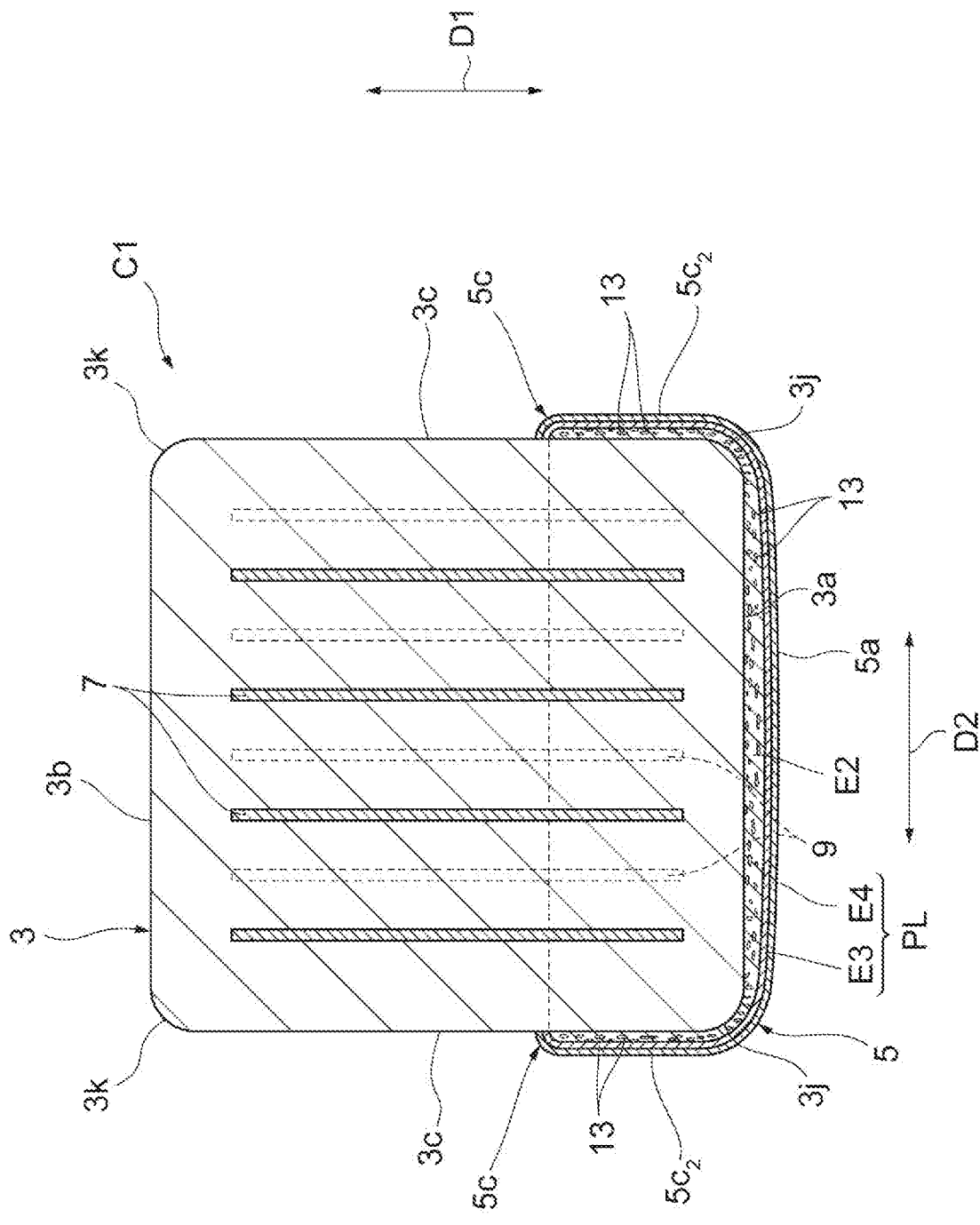
FIG. 5 is a view illustrating a cross-sectional configuration of the multilayer capacitor according to the embodiment.
Figure 6:
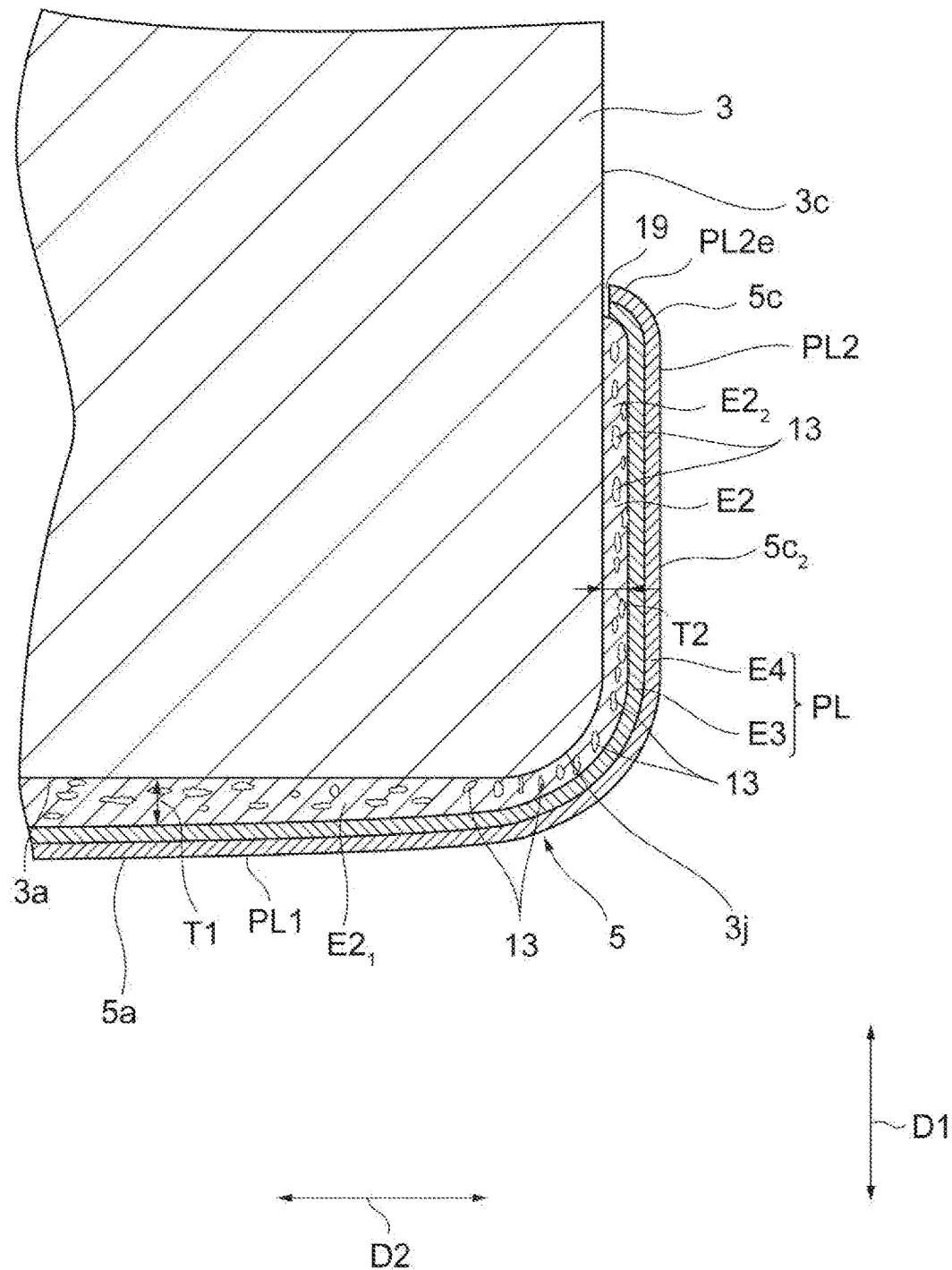
FIG. 6 is a view illustrating a cross-sectional configuration of an external electrode.
Figure 7:
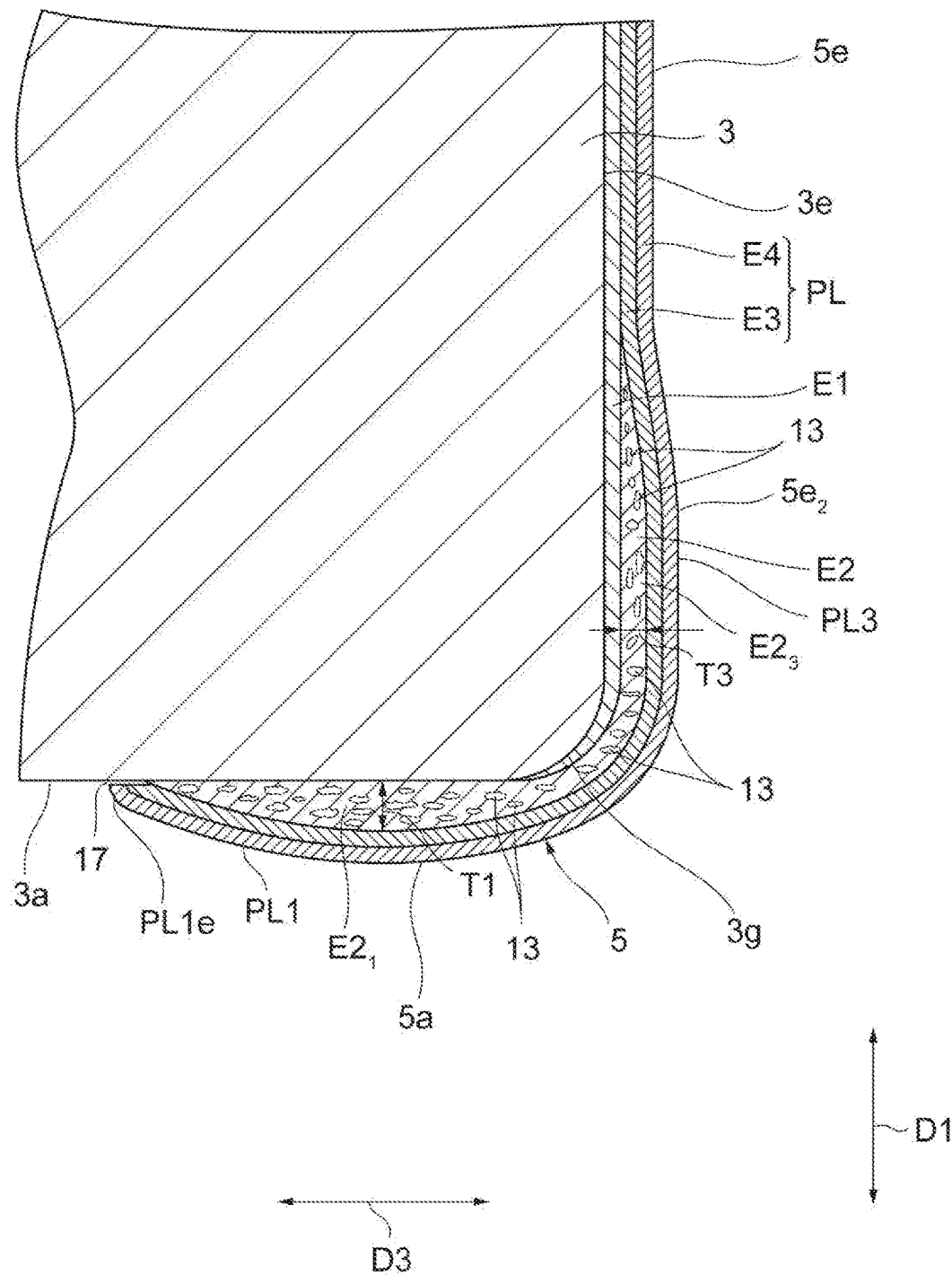
FIG. 7 is a view illustrating a cross-sectional configuration of an external electrode.
Figure 8:
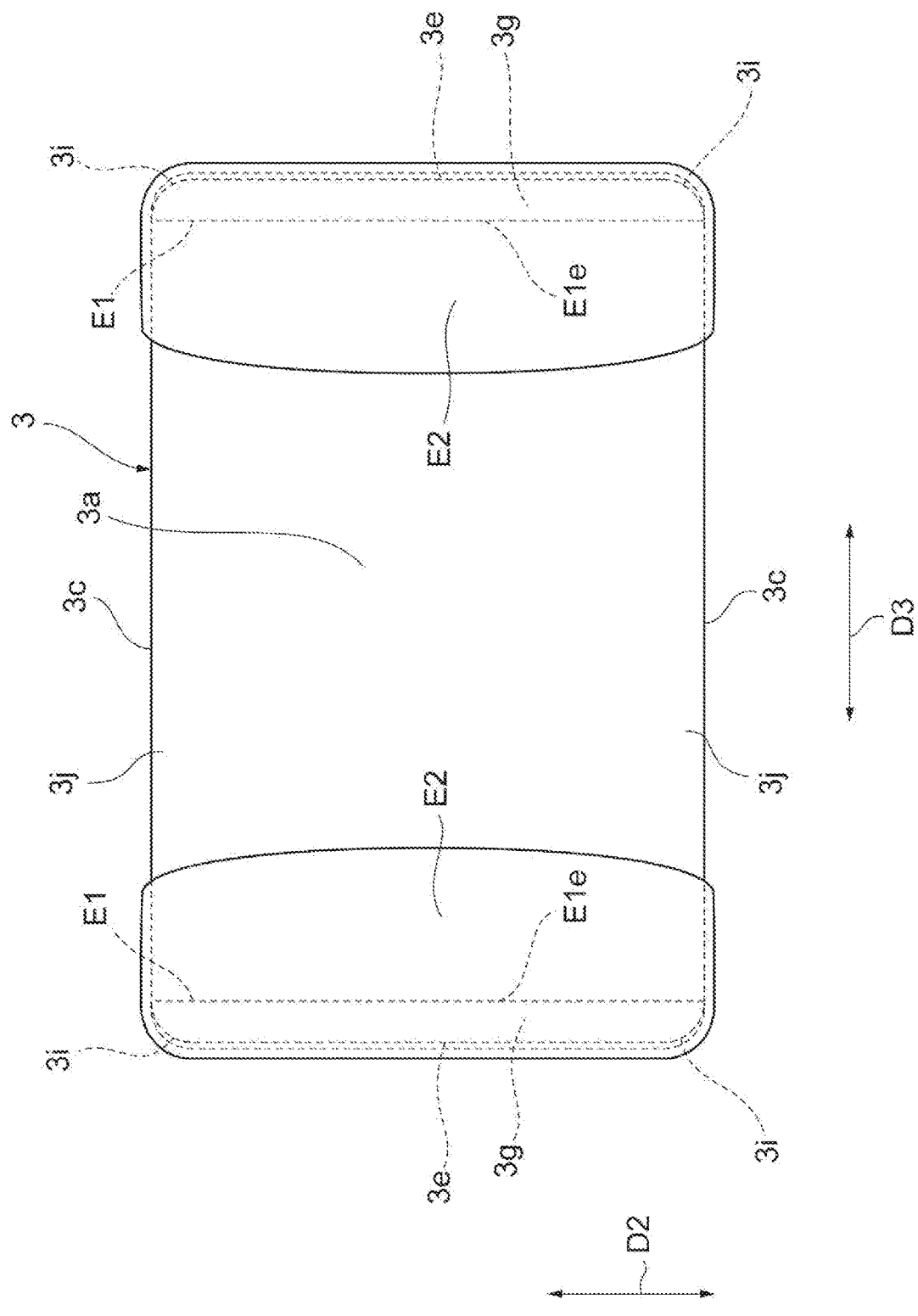
FIG. 8 is a plan view illustrating an element body, a first electrode layer, and a second electrode layer.
Figure 9:
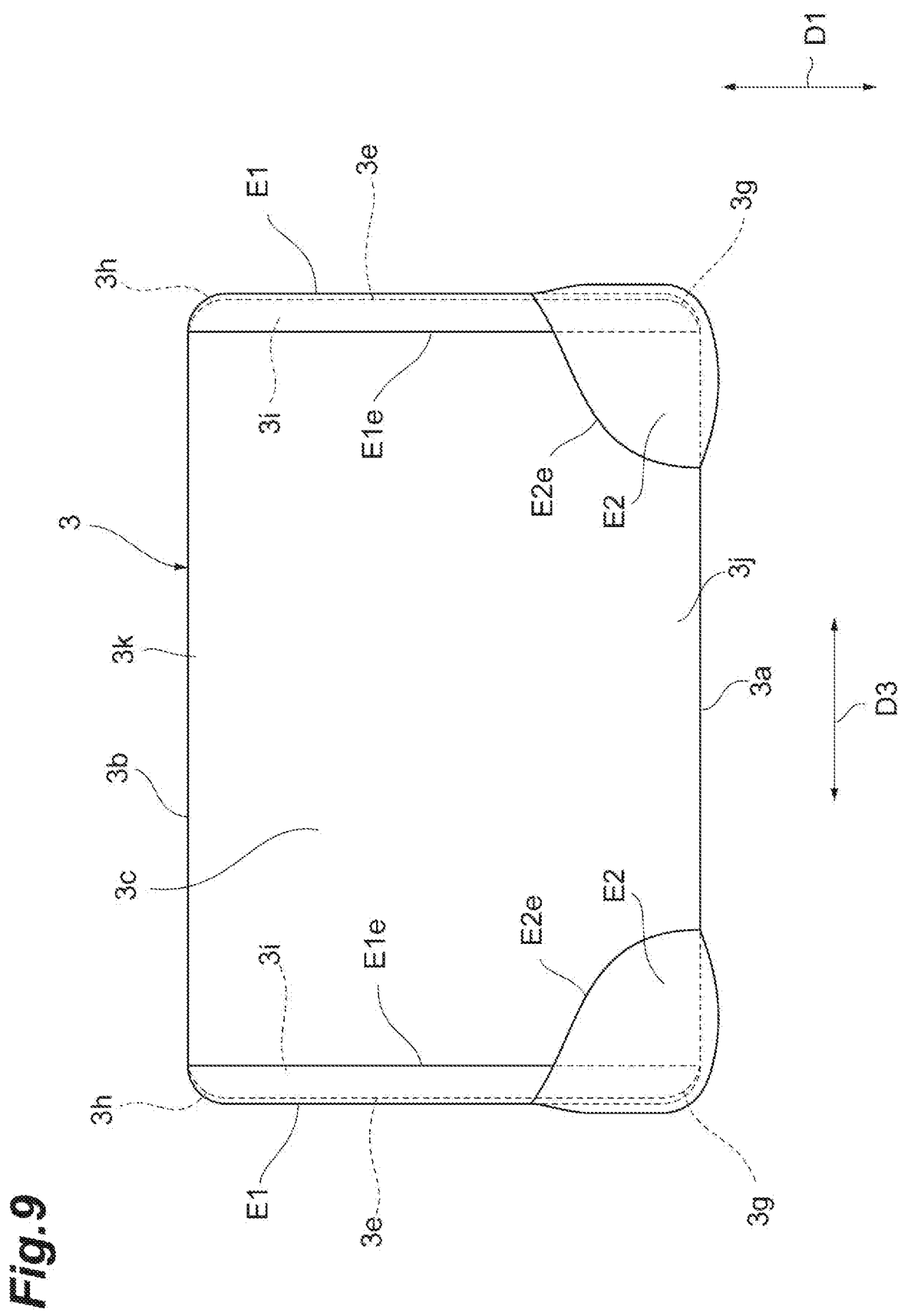
FIG. 9 is a side view illustrating the element body, the first electrode layer, and the second electrode layer.
Figure 10:
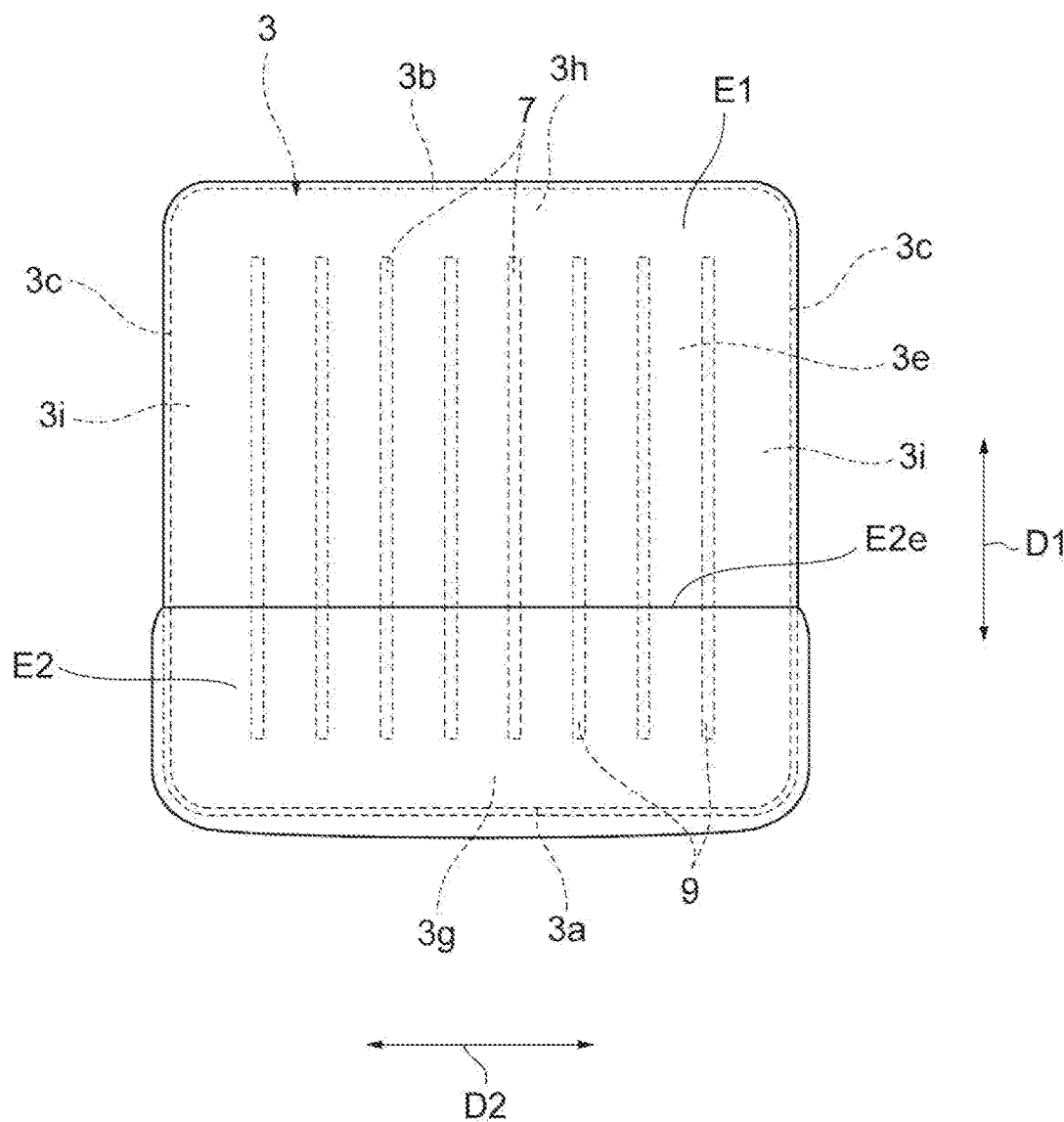
FIG. 10 is an end view illustrating the element body, the first electrode layer, and the second electrode layer.

A configuration of a multilayer capacitor C1 according to an embodiment will be described with reference to FIGS. 1 to 10. FIG. 1 is a perspective view of a multilayer capacitor according to the embodiment. FIG. 2 is a side view of the multilayer capacitor according to the embodiment. FIGS. 3 to 5 are views illustrating a cross-sectional configuration of the multilayer capacitor according to the embodiment. FIGS. 6 and 7 are views illustrating a cross-sectional configuration of an external electrode. FIG. 8 is a plan view illustrating an element body, a first electrode layer, and a second electrode layer. FIG. 9 is a side view illustrating the element body, the first electrode layer, and the second electrode layer. FIG. 10 is an end view illustrating the element body, the first electrode layer, and the second electrode layer. In the present embodiment, an electronic component is, for example, the multilayer capacitor C1.

As illustrated in FIG. 1, the multilayer capacitor C1 includes an element body 3 of a rectangular parallelepiped shape and a plurality of external electrodes 5. In the present embodiment, the multilayer capacitor C1 includes a pair of external electrodes 5. The pair of external electrodes 5 is disposed on an outer surface of the element body 3. The pair of external electrodes 5 is separated from each other. The rectangular parallelepiped shape includes a rectangular parallelepiped shape in which corners and ridges are chamfered, and a rectangular parallelepiped shape in which the corners and ridges are rounded.

The element body 3 includes a pair of principal surfaces 3a and 3b opposing each other, a pair of side surfaces 3c opposing each other, and a pair of end surfaces 3e opposing each other. The pair of principal surfaces 3a and 3b, the pair of side surfaces 3c, and the pair of end surfaces 3e have a rectangular shape. The direction in which the pair of principal surfaces 3a and 3b opposes each other is a first direction D1. The direction in which the pair of side surfaces 3c opposes each other is a second direction D2. The direction in which the pair of end surfaces 3e opposes each other is a third direction D3. The multilayer capacitor C1 is solder-mounted on an electronic device.

The electronic device includes, for example, a circuit board or an electronic component. The principal surface 3a of the multilayer capacitor C1 opposes the electronic device. The principal surface 3a is arranged to constitute a mounting surface. The principal surface 3a is the mounting surface. The principal surface 3a is also one side surface included in the element body 3 of the rectangular parallelepiped shape.

For example, in a case in which the principal surface 3a constitutes one side surface, the side surface 3c constitutes another side surface.

The first direction D1 is a direction orthogonal to the respective principal surfaces 3a and 3b and is orthogonal to the second direction D2. The third direction D3 is a direction parallel to the respective principal surfaces 3a and 3b and the respective side surfaces 3c, and is orthogonal to the first direction D1 and the second direction D2. The second direction D2 is a direction orthogonal to the respective side surfaces 3c. The third direction D3 is a direction orthogonal to the respective end surfaces 3e. In the present embodiment, a length of the element body 3 in the third direction D3 is larger than a length of the element body 3 in the first direction D1, and larger than a length of the element body 3 in the second direction D2. The third direction D3 is a longitudinal direction of the element body 3. The length of the element body 3 in the first direction D1 and the length of the element body 3 in the second direction D2 may be equivalent to each other. The length of the element body 3 in the first direction D1 and the length of the element body 3 in the second direction D2 may be different from each other.

The pair of side surfaces 3c extends in the first direction D1 to couple the pair of principal surfaces 3a and 3b. The pair of side surfaces 3c also extends in the third direction D3. The pair of end surfaces 3e extends in the first direction D1 to couple the pair of principal surfaces 3a and 3b. The pair of end surfaces 3e extends in the second direction D2.

The element body 3 includes a pair of ridge portions 3g, a pair of ridge portions 3h, four ridge portions 3i, a pair of ridge portions 3j, and a pair of ridge portions 3k. The ridge portion 3g is positioned between the end surface 3e and the principal surface 3a. The ridge portion 3h is positioned between the end surface 3e and the principal surface 3b. The ridge portion 3i is positioned between the end surface 3e and the side surface 3c. The ridge portion 3j is positioned between the principal surface 3a and the side surface 3c. The ridge portion 3k is positioned between the principal surface 3b and the side surface 3c. In the present embodiment, each of the ridge portions 3g, 3h, 3i, 3j, and 3k is rounded to curve. The element body 3 is subject to what is called a round chamfering process.

The end surface 3e and the principal surface 3a are indirectly adjacent to each other with the ridge portion 3g between the end surface 3e and the principal surface 3a. The end surface 3e and the principal surface 3b are indirectly adjacent to each other with the ridge portion 3h between the end surface 3e and the principal surface 3b. The end surface 3e and the side surface 3c are indirectly adjacent to each other with the ridge portion 3i between the end surface 3e and the side surface 3c. The principal surface 3a and the side surface 3c are indirectly adjacent to each other with the ridge portion 3j between the principal surface 3a and the side surface 3c. The principal surface 3b and the side surface 3c are indirectly adjacent to each other with the ridge portion 3k between the principal surface 3b and the side surface 3c.

The element body 3 is configured by laminating a plurality of dielectric layers in the second direction D2. The element body 3 includes the plurality of laminated dielectric layers. In the element body 3, a lamination direction of the plurality of dielectric layers coincides with the second direction D2. Each dielectric layer includes, for example, a sintered body of a ceramic green sheet containing a dielectric material. The dielectric material includes, for example, a dielectric ceramic of $BaTiO_3$ base, $Ba(Ti,Zr)O_3$ base, or $(Ba,Ca)TiO_3$ base. In an actual element body 3, each of the dielectric layers is integrated to such an extent that a boundary between the dielectric layers cannot be visually recognized. In the element body 3, the lamination direction of the plurality of dielectric layers may coincide with the first direction D1.

As illustrated in FIGS. 3 to 5, the multilayer capacitor C1 includes a plurality of internal electrodes 7 and a plurality of internal electrodes 9. Each of the internal electrodes 7 and 9 is an internal conductor disposed in the element body 3. Each of the internal electrodes 7 and 9 is made of a conductive material that is commonly used as an internal conductor of a multilayer electronic component. The conductive material includes, for example, a base metal. The conductive material includes, for example, Ni or Cu. Each of the internal electrodes 7 and 9 is configured as a sintered body of conductive paste containing the conductive material described above. In the present embodiment, the internal electrodes 7 and 9 are made of Ni.

The internal electrodes 7 and the internal electrodes 9 are disposed in different positions (layers) in the second direction D2. The internal electrodes 7 and the internal electrodes 9 are alternately disposed in the element body 3 to oppose each other in the second direction D2 with an interval therebetween. Polarities of the internal electrodes 7 and the internal electrodes 9 are different from each other. In a case in which the lamination direction of the plurality of dielectric layers is the first direction D1, the internal electrodes 7 and the internal electrodes 9 are disposed in different positions (layers) in the first direction D1. One end of each of the internal electrodes 7 and 9 is exposed to a corresponding end surface 3e of the pair of the end surfaces 3e. Each of the internal electrodes 7 and 9 includes the one end exposed to the corresponding end surface 3e.

The plurality of internal electrodes 7 and the plurality of internal electrodes 9 are alternately disposed in the second direction D2. The internal electrodes 7 and 9 are positioned in a plane approximately parallel to the side surfaces 3c. The internal electrodes 7 and the internal electrodes 9 oppose each other in the second direction D2. The direction (second direction D2) in which the internal electrodes 7 and the internal electrodes 9 oppose each other is orthogonal to the direction (first direction D1 and third direction D3) parallel to the side surfaces 3c. In a case in which the lamination direction of the plurality of dielectric layers is the first direction D1, the plurality of internal electrodes 7 and the plurality of internal electrodes 9 are alternately disposed in the first direction D1. In this case, the internal electrodes 7 and 9 are positioned in a plane approximately parallel to the principal surfaces 3a and 3b. The internal electrodes 7 and the internal electrodes 9 oppose each other in the first direction D1.

As illustrated in FIG. 1, the external electrodes 5 are disposed at both end portions of the element body 3 in the third direction D3. Each of the external electrodes 5 is disposed on the corresponding end surface 3e side of the element body 3. The external electrode 5 is disposed on at least the principal surface 3a and side surface 3c adjacent to each other. The external electrode 5 is also disposed on at least the principal surface 3a and end surface 3e adjacent to each other. As illustrated in FIGS. 2 to 5, the external electrode 5 includes a plurality of electrode portions 5a, 5b, 5c, and 5e. The electrode portion 5a is disposed on the principal surface 3a and the ridge portion 3g. The electrode portion 5b is disposed on the principal surface 3b and the ridge portion 3h. The electrode portion 5c is disposed on each side surface 3c and each ridge portion 3i. The electrode portion 5e is disposed on the corresponding end surface 3e. The external electrode 5 also includes electrode portions disposed on the ridge portions 3j. Each of the external electrodes 5 is disposed on at least the end surface 3e.

The external electrode 5 is formed on the four surfaces, that is, the principal surface 3a, the end surface 3e, and the pair of side surfaces 3c, as well as on the ridge portions 3g, 3h, 3i, and 3j. The electrode portions 5a, 5b, 5c, and 5e adjacent each other are coupled and are electrically connected to each other. Each electrode portion 5e covers all the one ends of the corresponding internal electrodes 7 or 9. The electrode portion 5e is directly connected to the corresponding internal electrodes 7 or 9. The external electrode 5 is electrically connected to the corresponding internal electrodes 7 or 9. As illustrated in FIGS. 3 to 5, the external electrode 5 includes a first electrode layer E1, a second electrode layer E2, a third electrode layer E3, and a fourth electrode layer E4. The fourth electrode layer E4 is arranged to constitute the outermost layer of the external electrode 5. Each of the electrode portions 5a, 5c, and 5e includes the first electrode layer E1, the second electrode layer E2, the third electrode layer E3, and the fourth electrode layer E4. The electrode portion 5b includes the first electrode layer E1, the third electrode layer E3, and the fourth electrode layer E4.

The first electrode layer E1 included in the electrode portion 5a is disposed on the ridge portion 3g, and is not disposed on the principal surface 3a. The first electrode layer E1 included in the electrode portion 5a is formed to cover the entire ridge portion 3g. The first electrode layer E1 is not formed on the principal surface 3a. The first electrode layer E1 included in the electrode portion 5a is in contact with the entire ridge portion 3g. The principal surface 3a is not covered with the first electrode layer E1, and is exposed from the first electrode layer E1. The first electrode layer E1 included in the electrode portion 5a may be disposed on the principal surface 3a. In this case, the first electrode layer E1 included in the electrode portion 5a is formed to cover one part of the principal surface 3a and the entire ridge portion 3g. That is, the first electrode layer E1 included in the electrode portion 5a is also in contact with the one part of the principal surface 3a. The one part of the principal surface 3a is, for example, the partial region near the end surface 3e, in the principal surface 3a.

The second electrode layer E2 included in the electrode portion 5a is disposed on the first electrode layer E1 and on the principal surface 3a. In the electrode portion 5a, the second electrode layer E2 covers the entire first electrode layer E1. In the electrode portion 5a, the second electrode layer E2 is in contact with the entire first electrode layer E1. The second electrode layer E2 included in the electrode portion 5a is in contact with one part of the principal surface 3a. The one part of the principal surface 3a is, for example, the partial region near the end surface 3e, in the principal surface 3a. That is, the one part of the principal surface 3a is close to the end surface 3e. The second electrode layer E2 included in the electrode portion 5a includes a portion $E2_1$ positioned on the principal surface 3a. The electrode portion 5a is four-layered on the ridge portion 3g, and is three-layered on the principal surface 3a. The second electrode layer E2 included in the electrode portion 5a is formed to cover the one part of the principal surface 3a and the entire ridge portion 3g. As described above, the one part of the principal surface 3a is, for example, the partial region near the end surface 3e, in the principal surface 3a. The second electrode layer E2 included in the electrode portion 5a indirectly covers the entire ridge portion 3g and the one part of the principal surface 3a in such a manner that the first electrode layer E1 is positioned between the second electrode layer E2 and the element body 3. The second electrode layer E2 included in the electrode portion 5a directly covers the one part of the principal surface 3a. The second electrode layer E2 included in the electrode portion 5a directly covers an entire portion of the first electrode layer E1 formed on the ridge portion 3g. In a case in which the first electrode layer E1 included in the electrode portion 5a is disposed on the principal surface 3a, the electrode portion 5a is four-layered on the principal surface 3a and the ridge portion 3g. In a case in which the first electrode layer E1 included in the electrode portion 5a is disposed on the principal surface 3a, the portion $E2_1$ of the second electrode layer E2 includes a portion being in contact with the principal surface 3a and a portion being in contact with the first electrode layer E1.

The first electrode layer E1 included in the electrode portion 5b is disposed on the ridge portion 3h, and is not disposed on the principal surface 3b. The first electrode layer E1 included in the electrode portion 5b is formed to cover the entire ridge portion 3h. The first electrode layer E1 is not formed on the principal surface 3b. The first electrode layer E1 included in the electrode portion 5b is in contact with the entire ridge portion 3h. The principal surface 3b is not covered with the first electrode layer E1, and is exposed from the first electrode layer E1. The first electrode layer E1 included in the electrode portion 5b may be disposed on the principal surface 3b. In this case, the first electrode layer E1 included in the electrode portion 5b is formed to cover one part of the principal surface 3b and the entire ridge portion 3h. That is, the first electrode layer E1 included in the electrode portion 5b is also in contact with the one part of the principal surface 3b. The one part of the principal surface 3b is, for example, the partial region near the end surface 3e, in the principal surface 3b. The electrode portion 5b does not include the second electrode layer E2. The principal surface 3b is not covered with the second electrode layer E2, and is exposed from the second electrode layer E2. The second electrode layer E2 is not formed on the principal surface 3b. The electrode portion 5b is three-layered.

The first electrode layer E1 included in the electrode portion 5c is disposed on the ridge portion 3i, and is not disposed on the side surface 3c. The first electrode layer E1 included in the electrode portion 5c is formed to cover the entire ridge portion 3i. The first electrode layer E1 is not formed on the side surface 3c. The first electrode layer E1 included in the electrode portion 5c is in contact with the entire ridge portion 3i. The side surface 3c is not covered with the first electrode layer E1, and is exposed from the first electrode layer E1. The first electrode layer E1 included in the electrode portion 5c may be disposed on the side surface 3c. In this case, the first electrode layer E1 included in the electrode portion 5c is formed to cover one part of the side surface 3c and the entire ridge portion 3i. That is, the first electrode layer E1 included in the electrode portion 5c is also in contact with the one part of the side surface 3c. The one part of the side surface 3c is, for example, the partial region near the end surface 3e, in the side surface 3c.

The second electrode layer E2 included in the electrode portion 5c is disposed on the first electrode layer E1 and on the side surface 3c. In the electrode portion 5c, the second electrode layer E2 covers one part of the first electrode layer E1. In the electrode portion 5c, the second electrode layer E2 is in contact with one part of the side surface 3c and the one part of the first electrode layer E1. The second electrode layer E2 included in the electrode portion 5c includes a portion $E2_2$ positioned on the side surface 3c. The second electrode layer E2 included in the electrode portion 5c is formed to cover one part of the ridge portion 3i and the one part of the side surface 3c. The one part of the ridge portion 3i is, for example, a partial region near the principal surface 3a, in the ridge portion 3i. That is, the one part of the ridge portion 3i is close to the principal surface 3a. The one part of the side surface 3c is, for example, a corner region near the principal surface 3a and end surface 3e, in the side surface 3c. That is, the one part of the side surface 3c is close to the principal surface 3a and end surface 3e. The second electrode layer E2 included in the electrode portion 5c indirectly covers the one part of the ridge portion 3i in such a manner that the first electrode layer E1 is positioned between the second electrode layer E2 and the element body 3. The second electrode layer E2 included in the electrode portion 5c indirectly covers the one part of the ridge portion 3i. The second electrode layer E2 included in the electrode portion 5c directly covers the one part of the side surface 3c. The second electrode layer E2 included in the electrode portion 5c directly covers a part of the portion of the first electrode layer E1 formed on the ridge portion 3i. In a case in which the first electrode layer E1 included in the electrode portion 5c is disposed on the side surface 3c, the portion $E2_2$ of the second electrode layer E2 includes a portion being in contact with the side surface 3c and a portion being in contact with the first electrode layer E1.

The electrode portion 5c includes a plurality of regions $5c_1$ and $5c_2$. In the present embodiment, the electrode portion 5c includes only two regions $5c_1$ and $5c_2$. The region $5c_2$ is positioned closer to the principal surface 3a than the region $5c_1$. The region $5c_1$ includes the first electrode layer E1, the third electrode layer E3, and the fourth electrode layer E4. The region $5c_1$ does not include the second electrode layer E2. The region $5c_1$ is three-layered. The region $5c_2$ includes the first electrode layer E1, the second electrode layer E2, the third electrode layer E3, and the fourth electrode layer E4. The regions $5c_2$ is four-layered on the ridge portion 3i, and is three-layered on the side surface 3c. The region $5c_1$ is the region where the first electrode layer E1 is exposed from the second electrode layer E2. The region $5c_2$ is the region where the first electrode layer E1 is covered with the second electrode layer E2. The region $5c_2$ includes the portion $E2_2$.

The first electrode layer E1 included in the electrode portion 5e is disposed on the end surface 3e. The end surface 3e is entirely covered with the first electrode layer E1. The first electrode layer E1 included in the electrode portion 5e is in contact with the entire end surface 3e. The second electrode layer E2 included in the electrode portion 5e is disposed on the first electrode layer E1. In the electrode portion 5e, one part of the first electrode layer E1 is covered with the second electrode layer E2. In the electrode portion 5e, the second electrode layer E2 is in contact with the one part of the first electrode layer E1. The second electrode layer E2 included in the electrode portion 5e includes a portion $E2_3$ positioned on the end surface 3e. The second electrode layer E2 included in the electrode portion 5e is formed to cover one part of the end surface 3e. The one part of the end surface 3e is, for example, a partial region near the principal surface 3a, in the end surface 3e. That is, the one part of the end surface 3e is close to the principal surface 3a. The second electrode layer E2 included in the electrode portion 5e indirectly covers the one part of the side surface 3e in such a manner that the first electrode layer E1 is positioned between the second electrode layer E2 and the element body 3. The second electrode layer E2 included in the electrode portion 5e directly covers a part of the portion of the first electrode layer E1 formed on the end surface 3e.

In the electrode portion 5e, the first electrode layer E1 is formed on the end surface 3e to be coupled to the one ends of the corresponding internal electrodes 7 or 9.

The electrode portion 5e includes a plurality of regions $5e_1$ and $5e_2$. In the present embodiment, the electrode portion 5e includes only two regions $5e_1$ and $5e_2$. The region $5e_2$ is positioned closer to the principal surface 3a than the region $5e_1$. The region $5e_1$ includes the first electrode layer E1, the third electrode layer E3, and the fourth electrode layer E4. The region $5e_1$ does not include the second electrode layer E2. The region $5e_1$ is three-layered. The region $5e_2$ includes the first electrode layer E1, the second electrode layer $E2_1$, the third electrode layer E3, and the fourth electrode layer E4. The third electrode layer E3 and fourth electrode later E4 included in the electrode portion 5e are formed to cover the entire end surface 3e when viewed from the third direction D3. In the present embodiment, the third electrode layer E3 and fourth electrode later E4 indirectly cover the entire end surface 3e. The regions $5e_2$ is four-layered. The region $5e_1$ is the region where the first electrode layer E1 is exposed from the second electrode layer E2. The region $5e_2$ is the region where the first electrode layer E1 is covered with the second electrode layer E2. The region $5e_2$ includes the portion $E2_3$.

As illustrated in FIG. 6, a maximum thickness T1 of the portion $E2_1$ of the second electrode layer E2 is larger than a maximum thickness T2 of the portion $E2_2$ of the second electrode layer E2. An area of the portion $E2_1$ of the second electrode layer E2 is larger than an area of the portion $E2_2$ of the second electrode layer E2. As illustrated in FIG. 7, the maximum thickness T1 of the second electrode layer E2 is larger than a maximum thickness T3 of the portion $E2_3$ of the second electrode layer E2. For example, in a case in which the portion $E2_1$ of the second electrode layer E2 constitutes the first portion, the portion $E2_2$ of the second electrode layer E2 constitutes the second portion. For example, in a case in which the portion $E2_1$ of the second electrode layer E2 constitutes the first portion, the portion $E2_3$ of the second electrode layer E2 constitutes the second portion. FIGS. 6 and 7 do not illustrate the internal electrodes 7 and 9.

The first electrode layer E1 is formed by sintering conductive paste applied onto the surface of the element body 3. The first electrode layer E1 is formed to cover the end surface 3e and the ridge portions 3g, 3h, 3i and 3j. The first electrode layer E1 is formed by sintering a metal component (metal powder) contained in the conductive paste. The first electrode layer E1 includes a sintered metal layer. The first electrode layer E1 includes a sintered metal layer formed on the element body 3. The first electrode layer E1 is not intentionally formed on the pair of principal surfaces 3a and 3b and the pair of side surfaces 3c. The first electrode layer E1 may be unintentionally formed on the principal surfaces 3a and 3b and the side surfaces 3c due to a production error, for example. In the present embodiment, the first electrode layer E1 is a sintered metal layer made of Cu. The first electrode layer E1 may be a sintered metal layer made of Ni. The first electrode layer E1 contains a base metal. The conductive paste contains, for example, powder made of Cu or Ni, a glass component, an organic binder, and an organic solvent. The first electrode layer E1 included in the electrode portion 5a, the first electrode layer E1 included in the electrode portion 5b, the first electrode layer E1 included in the electrode portion 5c, and the first electrode layer E1 included in the electrode portion 5e are integrally formed.

The second electrode layer E2 is formed by curing conductive resin paste applied onto the first electrode layer E1, the principal surface 3a, and the pair of side surfaces 3c.

The second electrode layer E2 is formed over the first electrode layer E1 and the element body 3. The first electrode layer E1 is an underlying metal layer for forming the second electrode layer E2. The second electrode layer E2 is a conductive resin layer covering the first electrode layer E1. The second electrode layer E2 includes a conductive resin layer. The conductive resin paste contains, for example, a resin, a conductive material, and an organic solvent. The resin is, for example, a thermosetting resin. The conductive material includes, for example, metal powder. The metal powder includes, for example, Ag powder or Cu powder. The thermosetting resin includes, for example, a phenolic resin, an acrylic resin, a silicone resin, an epoxy resin, or a polyimide resin.

In the present embodiment, the second electrode layer E2 covers a partial region of the first electrode layer E1. The partial region of the first electrode layer E1 is, for example, the regions corresponding to the electrode portion 5a, the region $5c_2$ of the electrode portion 5c, and the region $5e_2$ of the electrode portion 5e, in the first electrode layer E1. The second electrode layer E2 directly covers a partial region of the ridge portion 3j. The partial region of the ridge portion 3j is, for example, the partial region near the end surface 3e, in the ridge portion 3j. That is, the partial region of the ridge portion 3j is close to the end surface 3e. The second electrode layer E2 is in contact with the partial region of the ridge portion 3j. The second electrode layer E2 included in the electrode portion 5a, the second electrode layer E2 included in the electrode portion 5b, the second electrode layer E2 included in the electrode portion 5c, and the second electrode layer E2 included in the electrode portion 5e are integrally formed.

The third electrode layer E3 is formed on the second electrode layer E2 by plating method. In the present embodiment, the third electrode layer E3 is formed on the second electrode layer E2 by Ni plating. The third electrode layer E3 is a Ni plating layer. The third electrode layer E3 may be an Sn plating layer, a Cu plating layer, or an Au plating layer. The third electrode layer E3 contains Ni, Sn, Cu, or Au. The Ni plating layer has better solder leach resistance than the metal contained in the second electrode layer E2.

The fourth electrode layer E4 is formed on the third electrode layer E3 by plating method. The fourth electrode layer E4 includes a solder plating layer. In the present embodiment, the fourth electrode layer E4 is formed on the third electrode layer E3 by Sn plating. The fourth electrode layer E4 is an Sn plating layer. The fourth electrode layer E4 may be an Sn—Ag alloy plating layer, an Sn—Bi alloy plating layer, or an Sn—Cu alloy plating layer. The fourth electrode layer E4 contains Sn, Sn—Ag alloy, Sn—Bi alloy, or Sn—Cu alloy.

The third electrode layer E3 and the fourth electrode layer E4 constitute a plating layer PL formed on the second electrode layer E2. In the present embodiment, the plating layer PL formed on the second electrode layer E2 is two-layered. The third electrode layer E3 is an intermediate plating layer positioned between the fourth electrode layer E4 arranged to constitute the outermost layer and the second electrode layer E2. The third electrode layer E3 included in the electrode portion 5a, the third electrode layer E3 included in the electrode portion 5b, the third electrode layer E3 included in the electrode portion 5c, and the third electrode layer E3 included in the electrode portion 5e are integrally formed. The fourth electrode layer E4 included in the electrode portion 5a, the fourth electrode layer E4 included in the electrode portion 5b, the fourth electrode layer E4 included in the electrode portion 5c, and the fourth electrode layer E4 included in the electrode portion 5e are integrally formed.

The first electrode layer E1 (first electrode layer E1 included in the electrode portion 5e) is formed on the end surface 3e to be connected to the corresponding internal electrodes 7 or 9. The first electrode layer E1 covers the entire end surface 3e, the entire ridge portion 3g, the entire ridge portion 3h, and the entire ridge portion 3i. The second electrode layer E2 (second electrode layers E2 included in the electrode portions 5a, 5c, and 5e) continuously covers one part of the principal surface 3a, one part of the end surface 3e, and one part of each of the pair of side surfaces 3c. The second electrode layer E2 (second electrode layers E2 included in the electrode portions 5a, 5c, and 5e) covers the entire ridge portion 3g, one part of the ridge portion 3i, and one part of the ridge portion 3j. The second electrode layer E2 includes a plurality of portions each corresponding to the one part of the principal surface 3a, the one part of the end surface 3e, the one part of each of the pair of side surfaces 3c, the entire ridge portion 3g, the one part of the ridge portion 3i, and the one part of the ridge portion 3j. The first electrode layer E1 (first electrode layer E1 included in the electrode portion 5e) is directly connected to the corresponding internal electrodes 7 or 9.

The first electrode layer E1 (first electrode layers E1 included in the electrode portions 5a, 5b, 5c, and 5e) includes a region covered with the second electrode layer E2 (second electrode layers E2 included in the electrode portions 5a, 5c, and 5e), and a region not covered with the second electrode layer E2 (second electrode layers E2 included in the electrode portions 5a, 5c, and 5e). The region not covered with the second electrode layer E2 is a region exposed from the second electrode layer E2. The third electrode layer E3 and the fourth electrode layer E4 cover the region not covered with the second electrode layer E2 in the first electrode layer E1, and the second electrode layer E2.

As illustrated in FIG. 8, when viewed from the first direction D1, the first electrode layer E1 (first electrode layer E1 included in the electrode portion 5a) is entirely covered with the second electrode layer E2. When viewed from the first direction D1, the first electrode layer E1 (first electrode layer E1 included in the electrode portion 5a) is not exposed from the second electrode layer E2.

As illustrated in FIG. 9, when viewed from the second direction D2, a first end region near the principal surface 3a of the first electrode layer E1 is covered with the second electrode layer E2. The first end region of the first electrode layer E1 includes the first electrode layer E1 included in the region $5c_2$. The first end region of the first electrode layer E1 is close to the principal surface 3a. When viewed from the second direction D2, an end edge E2e of the second electrode layer E2 crosses an end edge E1e of the first electrode layer E1. When viewed from the second direction D2, a second end region near the principal surface 3b of the first electrode layer E1 is exposed from the second electrode layer E2. The second end region of the first electrode layer E1 includes the first electrode layer E1 included in the region $5c_1$. The second end region of the first electrode layer E1 is close to the principal surface 3b.

As illustrated in FIG. 10, when viewed from the third direction D3, a third end region near the principal surface 3a of the first electrode layer E1 is covered with the second electrode layer E2. The third end region of the first electrode layer E1 includes the first electrode layer E1 included in the region $5e_2$. The third end region of the first electrode layer E1 is close to the principal surface 3a. When viewed from the third direction D3, the end edge E2e of the second electrode layer E2 is positioned on the first electrode layer E1. When viewed from the third direction D3, a fourth end region near the principal surface 3b of the first electrode layer E1 is exposed from the second electrode layer E2. The fourth end region of the first electrode layer E1 includes the first electrode layer E1 included in the region $5e_1$. The fourth end region of the first electrode layer E1 is close to the principal surface 3b.

In the present embodiment, the second electrode layer E2 continuously covers only the one part of the principal surface 3a, only the one part of the end surface 3e, and only the one part of each of the pair of side surfaces 3c. The second electrode layer E2 covers the entire ridge portion 3g, only the one part of the ridge portion 3i, and only the one part of the ridge portion 3j. The portion of the first electrode layer E1 covering the ridge portion 3i is partially exposed from the second electrode layer E2. For example, the first electrode layer E1 included in the region $5c_1$ is exposed from the second electrode layer E2.

In the second electrode layer E2, a plurality of gaps 13 exists as illustrated in FIGS. 3 to 7. The plurality of gaps 13 is dispersed in the second electrode layer E2. Some gaps 13 of the plurality of gaps 13 communicate with each other. The gaps 13 communicating with each other constitute at least one passage. The passage constituted by the gaps 13 communicating with each other is open at the surface of the second electrode layer E2. In a cross-section along a thickness direction of the second electrode layer E2, a maximum length of the gap 13 is in the range of 1 to 20 μm. In the present embodiment, the maximum length of the gap 13 is 20 μm.

As described above, the plating layer PL includes the third electrode layer E3 and the fourth electrode layer E4. The plating layer PL includes a portion PL1 located on the portion $E2_1$, a portion PL2 located on the portion $E2_2$, and a portion PL3 located on the portion $E2_3$. The portion PL1 includes an end edge PL1e. The portion PL2 includes an end edge PL2e. Since the entire end surface 3e is covered with the external electrode 5 in the present embodiment, the portion PL3 includes no end edge. The plating layer PL (the third electrode layer E3 and the fourth electrode layer E4) is separated from the element body 3. As illustrated in FIG. 7, a clearance 17 exists between the end edge PL1e and the element body 3 (principal surface 3a). As illustrated in FIG. 6, a clearance 19 exists between the end edge PL2e and the element body 3 (side surface 3c). Each width of the clearances 17 and 19 is, for example, larger than 0 and equal to or smaller than 3 μm. The width of the clearance 17 and the width of the clearance 19 may be the same. The width of the clearance 17 and the width of the clearance 19 may be different.

The second electrode layer E2 includes the portion $E2_1$, the portion $E2_2$, and the portion $E2_3$ as described above. An existence ratio of the gaps 13 in the portion $E2_1$ of the second electrode layer E2 is greater than an existence ratio of the gaps 13 in the portion $E2_2$ of the second electrode layer E2. The existence ratio of the gaps 13 in the portion $E2_1$ of the second electrode layer E2 is greater than an existence ratio of the gaps 13 in the portion $E2_3$ of the second electrode layer E2. The existence ratio of the gaps 13 is a ratio of the total area of the gaps 13 to an area of the second electrode layer E2 in a cross-section along a thickness direction of the second electrode layer E2. In the present embodiment, the thickness direction of the second electrode layer E2 coincides with the direction orthogonal to the principal surface 3a in the portion $E2_1$, coincides with the direction orthogonal to the side surface 3c in the portion $E2_2$, and coincides with the direction orthogonal to the end surface 3e in the portion $E2_3$. The thickness direction of the second electrode layer E2 coincides with the first direction D1 in the portion $E2_1$, coincides with the second direction D2 in the portion $E2_2$, and coincides with the third direction D3 in the portion $E2_3$.

The existence ratio of the gaps 13 in the portion $E2_1$ of the second electrode layer E2 is a value obtained by, for example, dividing the total area of the gaps 13 existing in the portion $E2_1$ in the cross-section along the thickness direction of the second electrode layer E2 (portion $E2_1$) by the area of the portion $E2_1$ and expressed in percentage. The existence ratio of the gaps 13 in the portion $E2_1$ is within the range of 5 to 35%. In the present embodiment, the total area of the gaps 13 existing in the portion $E2_1$ is 1250 to 21000 $\mu m^2$. The area of the portion $E2_1$ is 0.025 to 0.060 $mm^2$. For example, the total area of the gaps 13 existing in the portion $E2_1$ is 9000 $\mu m^2$, and the area of the portion $E2_1$ is 0.045 $mm^2$. In this case, the existence ratio of the gaps 13 in the portion $E2_1$ is 20%. The area of the portion $E2_1$ is the area of a region defined by the surface of the first electrode layer E1 and the surface of the second electrode layer E2 in the portion $E2_1$. The area of the portion $E2_1$ includes the total area of the gaps 13 existing in the portion $E2_1$.

The existence ratio of the gaps 13 in the portion $E2_2$ of the second electrode layer E2 is a value obtained by, for example, dividing the total area of the gaps 13 existing in the portion $E2_2$ in the cross-section along the thickness direction of the second electrode layer E2 (portion $E2_2$) by the area of the portion $E2_2$ and expressed in percentage. The existence ratio of the gaps 13 in the portion $E2_2$ is within the range of 5 to 35%. In the present embodiment, the total area of the gaps 13 existing in the portion $E2_2$ is 1000 to 16800 $\mu m^2$. The area of the portion $E2_2$ is 0.02 to 0.048 $mm^2$. For example, the total area of the gaps 13 existing in the portion $E2_2$ is 2800 $\mu m^2$, and the area of the portion $E2_2$ is 0.028 $mm^2$. In this case, the existence ratio of the gaps 13 in the portion $E2_2$ is 10%. The area of the portion $E2_2$ is the area of a region defined by the surface of the first electrode layer E1 and the surface of the second electrode layer E2 in the portion $E2_2$. The area of the portion $E2_2$ includes the total area of the gaps 13 existing in the portion $E2_2$.

The existence ratio of the gaps 13 in the portion $E2_3$ of the second electrode layer E2 is a value obtained by, for example, dividing the total area of the gaps 13 existing in the portion $E2_3$ in the cross-section along the thickness direction of the second electrode layer E2 (portion $E2_3$) by the area of the portion $E2_3$ and expressed in percentage. The existence ratio of the gaps 13 in the portion $E2_3$ is within the range of 5 to 35%. In the present embodiment, the total area of the gaps 13 existing in the portion $E2_3$ is 1000 to 16800 $\mu m^2$. The area of the portion $E2_3$ is 0.02 to 0.048 $mm^2$. For example, the total area of the gaps 13 existing in the portion $E2_3$ is 2800 $\mu m^2$, and the area of the portion $E2_3$ is 0.028 $mm^2$. In this case, the existence ratio of the gaps 13 in the portion $E2_3$ is 10%. The area of the portion $E2_3$ is the area of a region defined by the surface of the first electrode layer E1 and the surface of the second electrode layer E2 in the portion $E2_3$. The area of the portion $E2_3$ includes the total area of the gaps 13 existing in the portion $E2_3$.

The maximum length of the gap 13 can be obtained, for example, as follows.

A cross-sectional photograph of the external electrode 5 is acquired. The cross-sectional photograph is a photograph obtained by capturing a cross-section when the electrode portion 5e is cut along a plane orthogonal to the end surface 3e. The cross-sectional photograph is, for example, a photograph obtained by capturing a cross-section of the electrode portion 5e when cut along a plane that is parallel to a pair of surfaces opposing each other (for example, the pair of side surfaces 3c) and equidistant from the pair of surfaces. The acquired cross-sectional photograph is subjected to image processing by software to determine boundaries of the gaps 13 and obtain the maximum length of the gap 13. The maximum lengths of the plurality of gaps 13 may be obtained, and an average value of the maximum lengths of the plurality of gaps 13 may be obtained. In this case, the average value is set as the maximum length of the gap 13.

The total area of the gaps 13 in each of the portions $E2_1$, $E2_2$, and $E2_3$ can be obtained, for example, as follows.

A cross-sectional photograph of the external electrode 5 (the electrode portion 5a and the electrode portion 5e) is acquired. The cross-sectional photograph is, for example, a photograph obtained by capturing a cross-section when the external electrode 5 is cut along a plane orthogonal to the principal surface 3a and the end surface 3e. The cross-sectional photograph is, for example, a photograph obtained by capturing the cross-section of the external electrode 5 when cut along a plane parallel to the pair of side surfaces 3c and equidistant from the pair of side surfaces 3c. The acquired cross-sectional photograph is subjected to image processing by software, boundaries of the gaps 13 are determined, and the total area of the gaps 13 existing in the portion $E2_1$ and the total area of the gaps 13 existing in the portion $E2_3$ are obtained.

A cross-sectional photograph of the external electrode 5 (the electrode portion 5c) is acquired. The cross-sectional photograph is, for example, a photograph obtained by capturing a cross-section when the external electrode 5 is cut along a plane orthogonal to the side surface 3c. The cross-sectional photograph is, for example, a photograph obtained by capturing the cross-section of the external electrode 5 when cut along a plane parallel to the pair of principal surfaces 3a and 3b and equidistant from the pair of principal surfaces 3a and 3b. The acquired cross-sectional photograph is subjected to image processing by software, boundaries of the gaps 13 are determined, and the total area of the gaps 13 existing in the portion $E2_2$ is obtained.

The area of the second electrode layer E2 in each of the portions $E2_1$, $E2_2$, and $E2_3$ can be obtained, for example, as follows.

A cross-sectional photograph of the external electrode 5 (the electrode portion 5a and the electrode portion 5e) is acquired. As described above, the cross-sectional photograph is the photograph obtained by capturing the cross-section when the external electrode 5 is cut along the plane orthogonal to the principal surface 3a and the end surface 3e. The acquired cross-sectional photograph is subjected to image processing by software, a surface of the first electrode layer E1 and a surface of the second electrode layer E2 are determined, and the area of the second electrode layer E2 in the portion $E2_1$ and the area of the second electrode layer E2 in the portions $E2_3$ are obtained.

A cross-sectional photograph of the external electrode 5 (the electrode portion 5c) is acquired. As described above, the cross-sectional photograph is the photograph obtained by capturing the cross-section when the external electrode 5 is cut along the plane orthogonal to the side surface 3c. The acquired cross-sectional photograph is subjected to image processing by software, a surface of the first electrode layer E1 and a surface of the second electrode layer E2 are determined, and the area of the second electrode layer E2 in the portion $E2_2$ is obtained.

The surface of the first electrode layer E1 is a boundary between the first electrode layer E1 and the second electrode layer E2. The surface of the second electrode layer E2 is a boundary between the second electrode layer E2 and the third electrode layer E3.

As described above, in the present embodiment, even in the case in which moisture absorbed in the resin contained in the second electrode layer E2 is gasified when the multilayer capacitor C1 is solder-mounted, gas generated from the moisture reaches the clearances 17 and 19 from the plurality of gaps 13. The gas reaching the clearances 17 and 19 moves out of the external electrode 5. Therefore, stress tends not to act on the second electrode layer E2. Consequently, the multilayer capacitor C1 suppresses peel-off of the second electrode layer E2.

In the multilayer capacitor C1, the existence ratio of the gaps 13 in the portion $E2_1$ of the second electrode layer E2 is greater than the existence ratio of the gaps 13 in the portion $E2_3$ of the second electrode layer E2. Therefore, the gas generated from the moisture in the second electrode layer E2 tends to move out of the external electrode 5 through the clearance 17 between the end edge PL1e and the element body 3. The gas generated in the portion $E2_3$ tends to reach the portion $E2_1$ through a passage constituted by the plurality of gaps 13. As described above, the gas reaching the portion $E2_1$ moves out of the external electrode 5 through the clearance 17 between the end edge PL1e and the element body 3. Therefore, the multilayer capacitor C1 controls the position where the gas exits.

In the multilayer capacitor C1, the existence ratio of the gaps 13 in the portion $E2_1$ of the second electrode layer E2 is greater than the existence ratio of the gaps 13 in the portion $E2_2$ of the second electrode layer E2. Therefore, the gas generated from the moisture in the second electrode layer E2 tends to move out of the external electrode 5 through the clearance 17 between the end edge PL1e and the element body 3. The gas tends not to move from the clearance 19 between the end edge PL2e and the element body 3. In the multilayer capacitor C1, the gas moves out of the external electrode 5 mainly through the clearance 17. Consequently, the multilayer capacitor C1 reliably controls the position where the gas exits.

When the multilayer capacitor C1 is solder-mounted, more molten solder exists at a position corresponding to the end surface 3e than at a position corresponding to the principal surface 3a. Therefore, solder splattering may occur at the position corresponding to the end surface 3e. The solder splattering is a phenomenon in which molten solder is blown away by the gas exiting from the external electrode 5 when the multilayer capacitor C1 is solder-mounted on the electronic device.

In the multilayer capacitor C1, the gas generated in the portion $E2_3$ tends to reach the portion $E2_1$ as described above. Therefore, the gas generated in the portion $E2_3$ moves out of the external electrode 5 from the portion $E2_1$ through the clearance 17. Consequently, the multilayer capacitor C1 controls occurrence of the solder splattering.

The gas generated in the second electrode layer E2 provided in the electrode portion 5c tends to reach the second electrode layer E2 provided in the electrode portion 5a through the passage formed by the plurality of gaps 13. The gas reaching the second electrode layer E2 provided in the electrode portion 5a moves out of the external electrode 5 through the clearance 17 as described above.

In the multilayer capacitor C1, the maximum thickness T1 of the portion $E2_1$ is larger than the maximum thickness T3 of the portion $E2_3$. Therefore, a gas movement path in the portion $E2_1$ increases, and the gas tends to move through the portion $E2_1$. The gas more tends to move out of the external electrode 5 through the clearance 17. Consequently, the stress the stress further tends not to act on the second electrode layer E2 in the multilayer capacitor C1, and the multilayer capacitor C1 further suppresses the peel-off of the second electrode layer E2.

In the multilayer capacitor C1, the maximum thickness T1 of the portion $E2_1$ is larger than the maximum thickness T2 of the portion $E2_2$. Therefore, a gas movement path in the portion $E2_1$ increases, and the gas tends to move through the portion $E2_1$. The gas more tends to move out of the external electrode 5 through the clearance 17. Consequently, the stress further tends not to act on the second electrode layer E2 in the multilayer capacitor C1, and the multilayer capacitor C1 further suppresses the peel-off of the second electrode layer E2.

In the multilayer capacitor C1, the total area of the gaps 13 in the portion $E2_1$ is within the range of 5 to 35% of the area of the portion $E2_1$ in the cross-section along the thickness direction of the portion $E2_1$ of the second electrode layer E2. In a case in which the total area of the gaps 13 in the portion $E2_1$ is smaller than 5% of the area of the portion $E2_1$ in the cross-section along the thickness direction of the portion $E2_1$, the gas generated from the moisture tends not to move inside the gap 13. In a case in which the total area of the gaps 13 in the portion $E2_1$ is larger than 35% of the area of the portion $E2_1$ in the cross-section along the thickness direction of the portion $E2_1$, moisture tends to enter the second electrode layer E2, and the gas generation amount may increase. Therefore, the multilayer capacitor C1 controls an increase in the gas generation amount and reduces inhibition of gas movement in the portion $E2_1$.

In the multilayer capacitor C1, the principal surface 3a is arranged to constitute the mounting surface.

In a case in which the multilayer capacitor C1 is solder-mounted on the electronic device, an external force applied onto the multilayer capacitor C1 from the electronic device sometimes acts on the element body 3 as stress. The external force acts on the element body 3 through the external electrode 5 from the solder fillet formed at the solder-mounting. In this case, a crack may occur in the element body 3. The external force tends to act on the principal surface 3a, for example.

Since the portion $E2_1$ is located on the principal surface 3a in the multilayer capacitor C1, the external force applied onto the multilayer capacitor C1 from the electronic device tends not to act on the element body 3. In a case in which the existence ratio of the gaps in the portion $E2_1$ is greater than the existence ratio of the gaps in the portion $E2_3$, the portion $E2_1$ tends to mitigate the external force applied onto the element body 3 as compared with the portion $E2_3$. Therefore, the multilayer capacitor C1 reliably controls occurrence of the crack in the element body 3.

In a case in which the existence ratio of the gaps in the portion $E2_1$ is greater than the existence ratio of the gaps in the portion $E2_2$, the portion $E2_1$ further tends to mitigate the external force applied onto the element body 3 as compared with the portion $E2_2$. Therefore, the multilayer capacitor C1 more reliably controls the occurrence of the crack in the element body 3.

In the multilayer capacitor C1, the second electrode layer E2 is formed to continuously cover the part of the principal surface 3a, the part of each of the side surfaces 3c, and the part of the end surface 3e. The plating layer PL (third electrode layer E3 and fourth electrode layer E4) is formed to cover the entire end surface 3e.

The external force also tends to act on a region defined by the part of the principal surface 3a, the part of each of the side surfaces 3c, and the part of the end surface 3e in the element body 3, for example. Since the second electrode layer E2 continuously covers the part of the principal surface 3a, the part of each of the side surfaces 3c, and the part of the end surface 3e in the multilayer capacitor C1, the external force applied onto the multilayer capacitor C1 from the electronic device tends not to act on the element body 3. Therefore, the multilayer capacitor C1 controls the occurrence of the crack in the element body 3.

Since the plating layer PL is formed to cover the entire end surface 3e, a clearance tends not to exist between the plating layer PL and the end surface 3e. Therefore, the gas generated in the portion $E2_3$ of the second electrode layer E2 moves to the portion $E2_1$ and moves out of the external electrode 5 through the clearance 17. Consequently, the multilayer capacitor C1 more reliably controls the position where the gas exits and reliably controls the occurrence of the solder splattering.

In the multilayer capacitor C1, the area of the portion $E2_1$ of the second electrode layer E2 is larger than the area of the portion $E2_2$ of the second electrode layer E2. Since the portion $E2_1$ is located on the principal surface 3a, the external force applied onto the multilayer capacitor C1 from the electronic device tends not to act on the element body 3 as described above. In the configuration in which the area of the portion $E2_1$ is larger than the area of the portion $E2_2$, the external force applied onto the multilayer capacitor C1 from the electronic device tends not to act on the element body 3, as compared with in the configuration in which the area of the portion $E2_1$ is smaller than the area of the portion $E2_2$. Since the existence ratio of the gaps 13 in the portion $E2_1$ is greater than the existence ratio of the gaps 13 in the portion $E2_2$, the portion $E2_1$ tends to mitigate the external force applied onto the element body 3 than the portion $E2_2$ as described above. Therefore, the multilayer capacitor C1 more reliably controls the occurrence of the crack in the element body 3.

In the multilayer capacitor C1, the maximum length of each of the plurality of gaps 13 is within the range of 1 to 20 μm in the cross-section along the thickness direction of the second electrode layer E2. In a case in which the maximum length of each of the plurality of gaps 13 is shorter than 1 μm in the cross-section along the thickness direction of the second electrode layer E2, the gas generated from the moisture may tend not to move inside the gap 13. In a case in which the maximum length of each of the plurality of gaps 13 is larger than 20 μm in the cross-section along the thickness direction of the second electrode layer E2, moisture may tend to remain in the second electrode layer E2 and the gas generation amount may increase. Therefore, the multilayer capacitor C1 reliably controls the increase in the gas generation amount and reliably reduces the inhibition of the gas movement in the second electrode layer E2.

Figure 11:
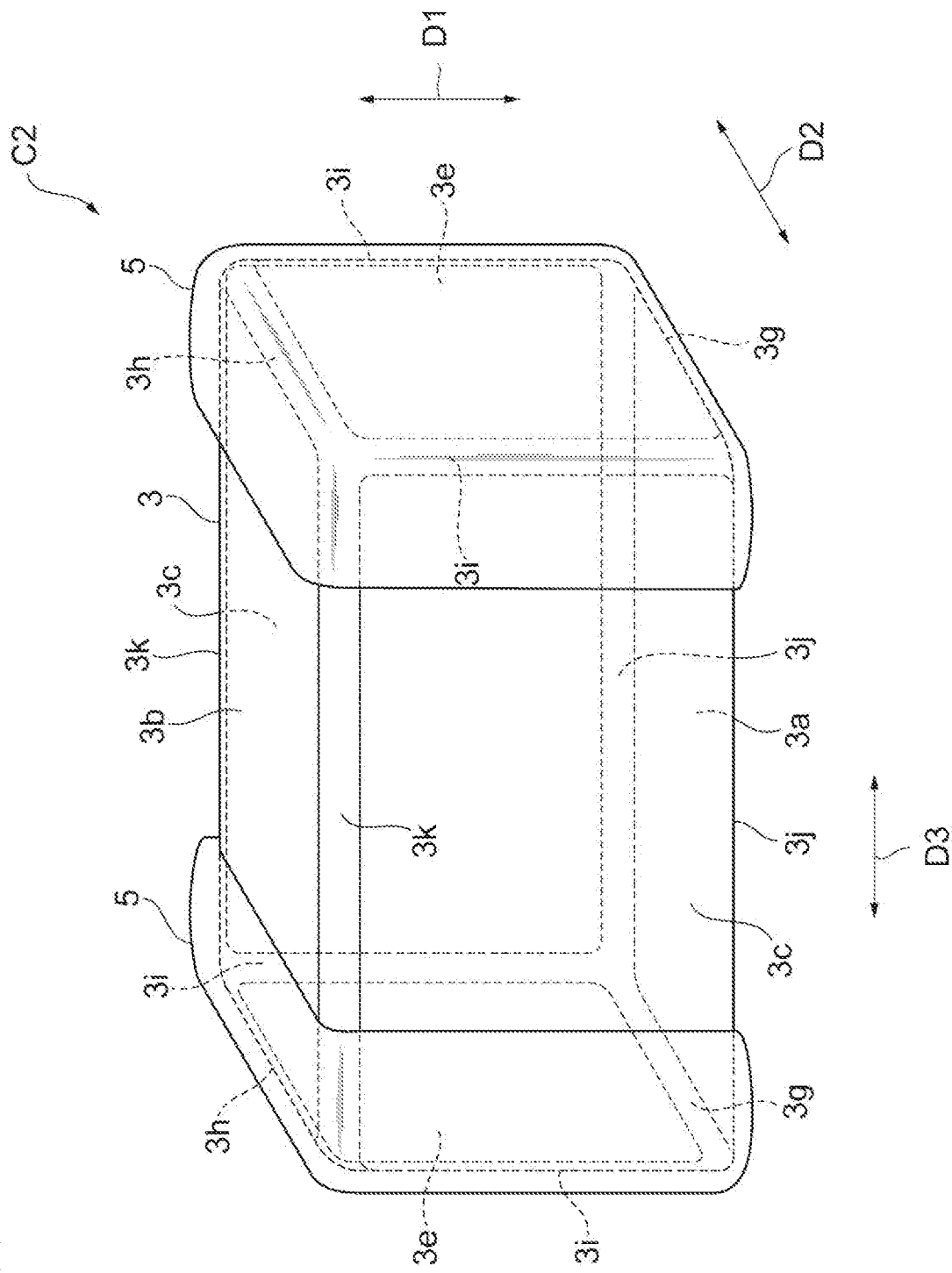
FIG. 11 is a perspective view of a multilayer capacitor according to a modification of the embodiment.
Figure 12:
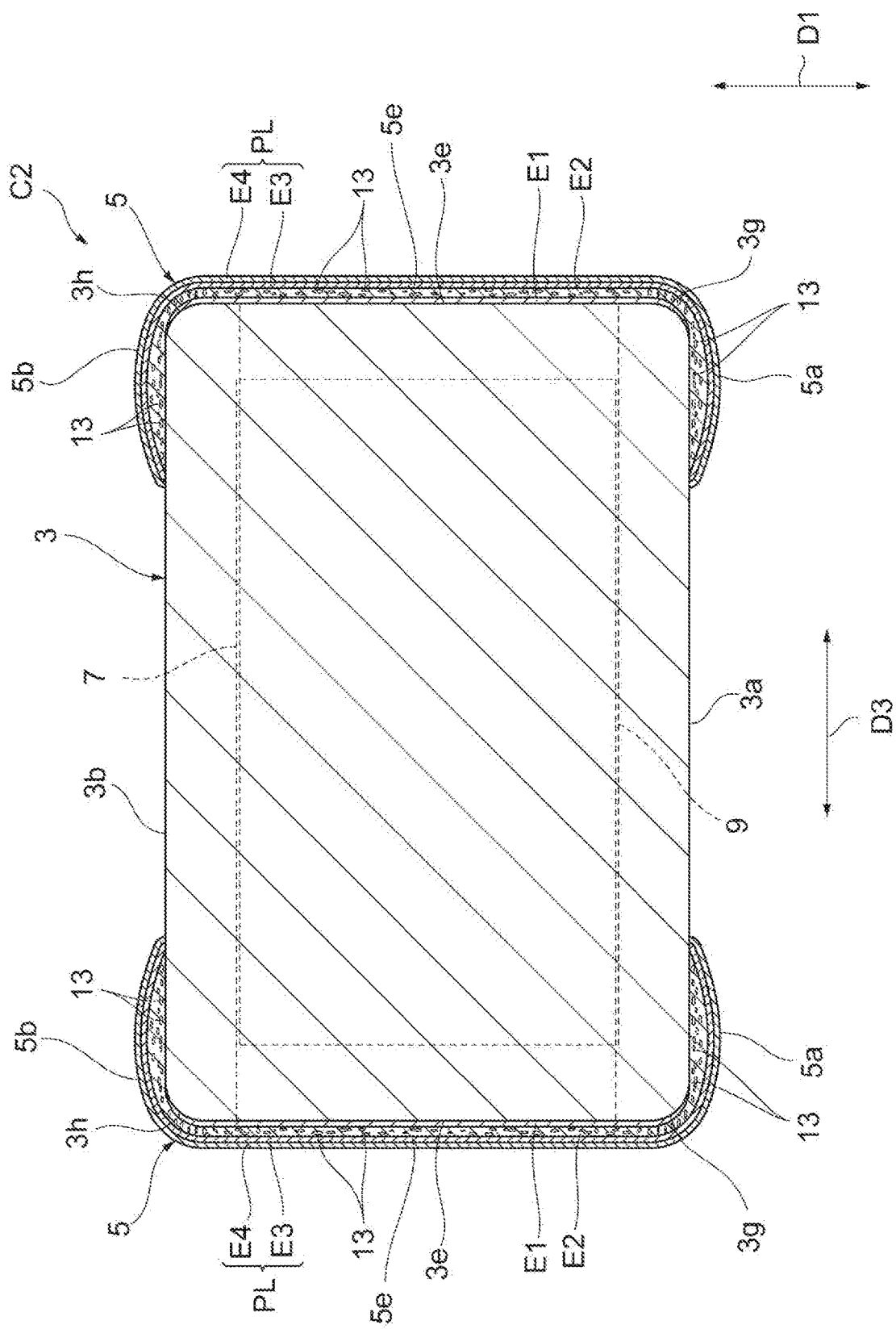
FIG. 12 is a view illustrating a cross-sectional configuration of the multilayer capacitor according to the modification.
Figure 13:
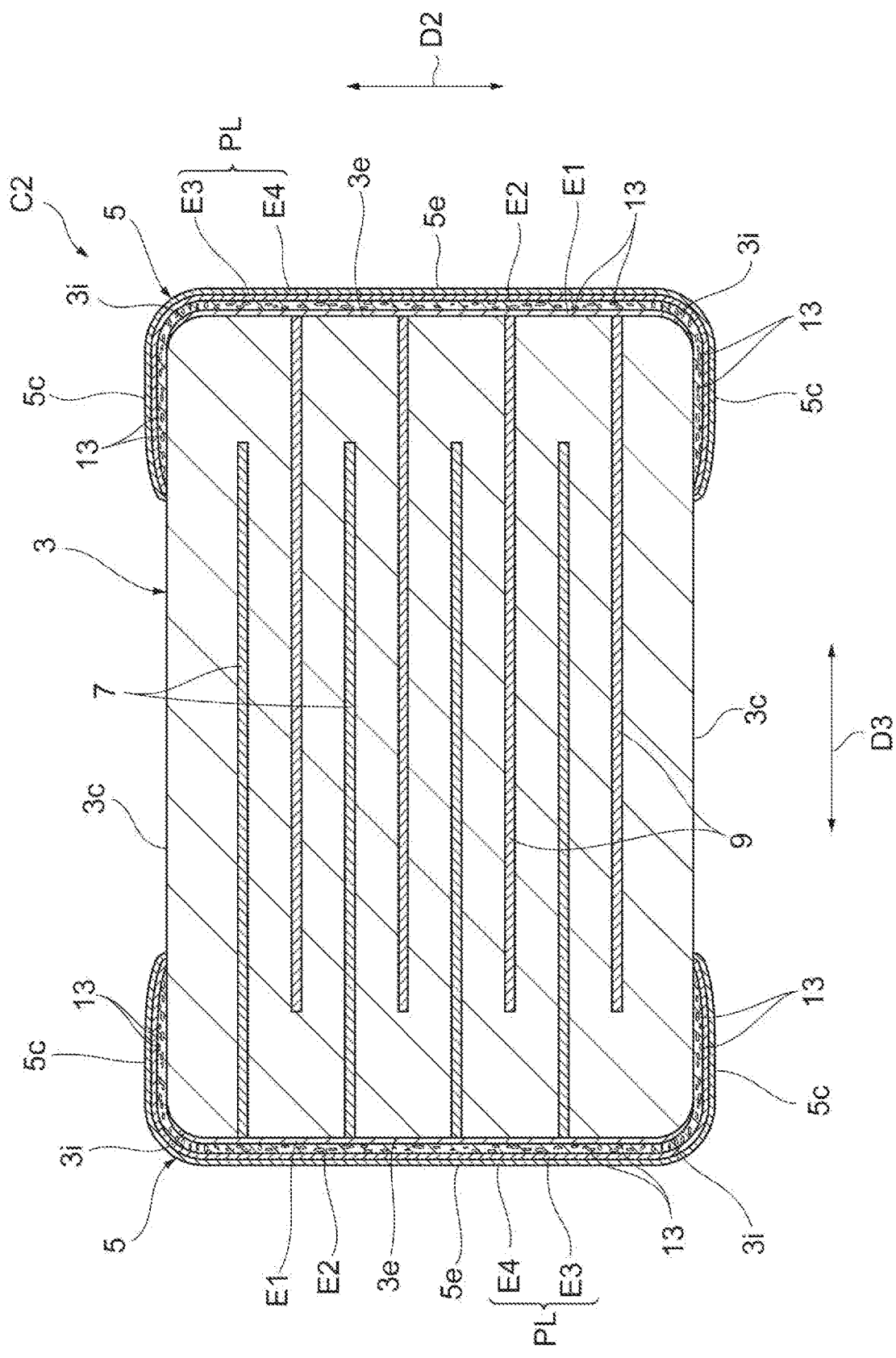
FIG. 13 is a view illustrating a cross-sectional configuration of the multilayer capacitor according to the modification.
Figure 14:
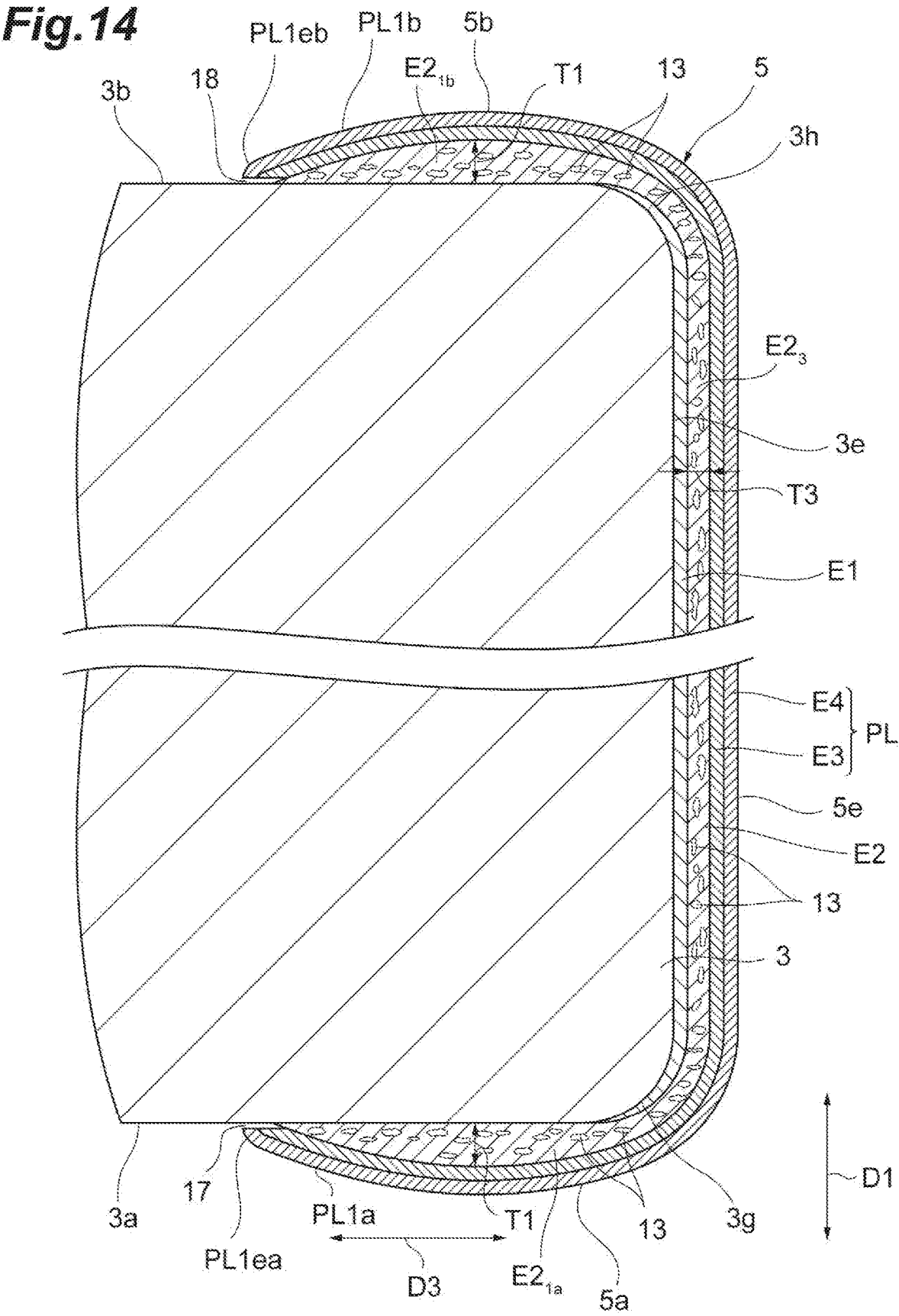
FIG. 14 is a view illustrating a cross-sectional configuration of an external electrode.
Figure 15:
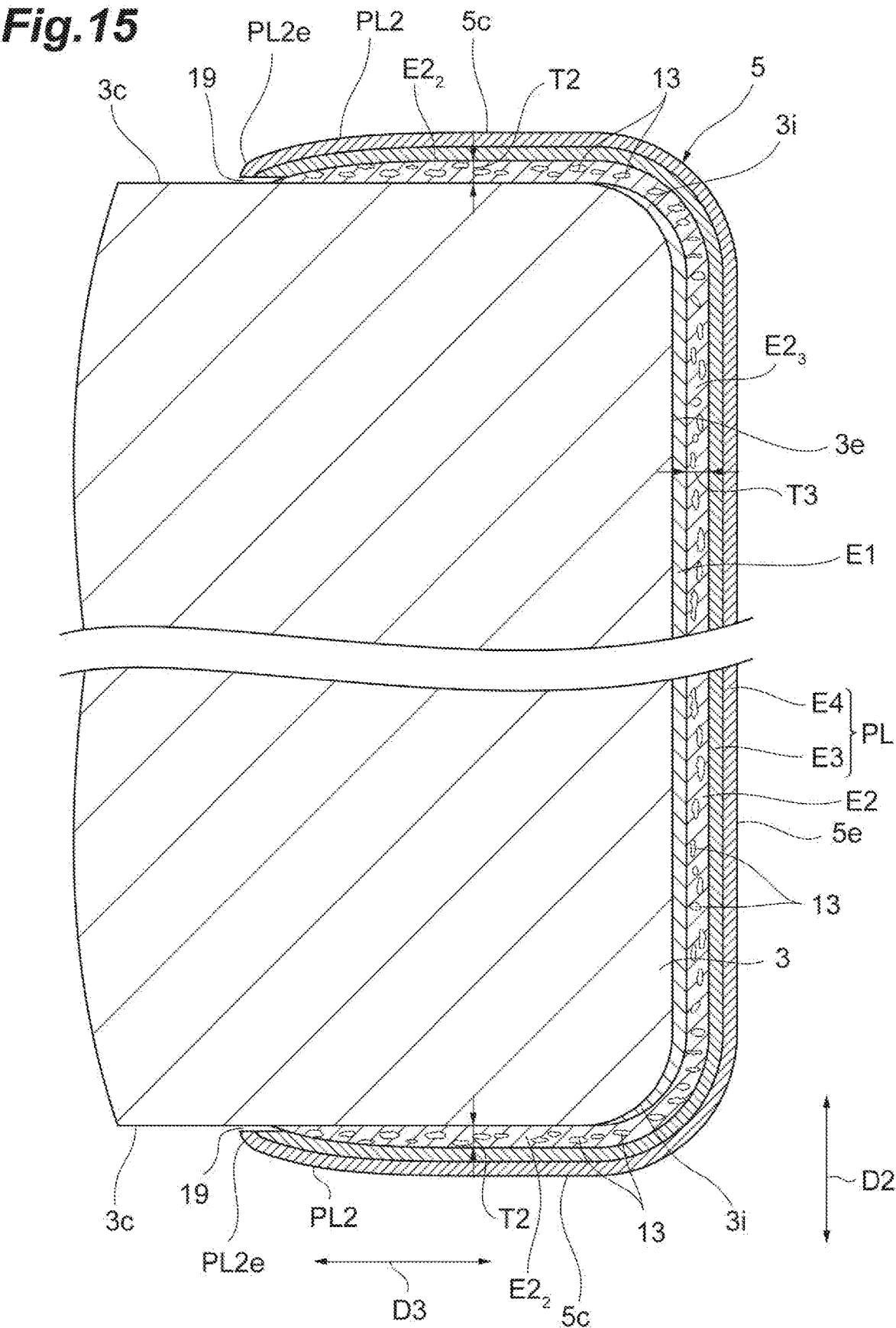
FIG. 15 is a view illustrating a cross-sectional configuration of an external electrode.

Next, a configuration of a multilayer capacitor C2 according to a modification of the present embodiment will be described with reference to FIGS. 11 to 15. FIG. 11 is a perspective view of a multilayer capacitor according to the modification. FIGS. 12 and 13 are views illustrating a cross-sectional configuration of the multilayer capacitor according to the modification. FIGS. 14 and 15 are views illustrating a cross-sectional configuration of an external electrode. The multilayer capacitor C2 is generally similar to or the same as the multilayer capacitor C1 described above. However, the present modification is different from the embodiment described above in the configurations of the external electrodes 5. Hereinafter, a difference between the embodiment and the modification will be mainly described.

As illustrated in FIGS. 11 to 13, the multilayer capacitor C2, as well as the multilayer capacitor C1, includes the element body 3, the plurality of external electrodes 5, the plurality of internal electrodes 7, and the plurality of internal electrodes 9. In the multilayer capacitor C2, one surface of the pair of principal surfaces 3a and 3b and pair of side surfaces 3c opposes electronic device. In the multilayer capacitor C2, for example, the side surface 3c is arranged to constitute a mounting surface. In this case, the side surface 3c is the mounting surface. The principal surfaces 3a and 3b are also side surfaces included in the element body 3 of the rectangular parallelepiped shape. For example, in a case in which the side surface 3c constitutes one side surface, the principal surface 3a or 3b constitutes another side surface. For example, in a case in which the principal surface 3a or 3b constitutes one side surface, the side surface 3c constitutes another side surface. The external electrode 5 is formed on the five surfaces, that is, the pair of principal surfaces 3a and 3b, the end surface 3e, and the pair of side surfaces 3c, as well as on the ridge portions 3g, 3h, 3i, and 3j. Each of the electrode portions 5a, 5b, 5c, and 5e includes the first electrode layer E1, the second electrode layer E2, the third electrode layer E3, and the fourth electrode layer E4.

The first electrode layer E1 included in the electrode portion 5a is disposed on the ridge portion 3g, and is not disposed on the principal surface 3a. The first electrode layer E1 included in the electrode portion 5a is formed to cover the entire ridge portion 3g. The first electrode layer E1 is not formed on the principal surface 3a. The first electrode layer E1 included in the electrode portion 5a is in contact with the entire ridge portion 3g. The principal surface 3a is not covered with the first electrode layer E1, and is exposed from the first electrode layer E1. Also in the present modification, the first electrode layer E1 included in the electrode portion 5a may be disposed on the principal surface 3a.

The second electrode layer E2 included in the electrode portion 5a is disposed on the first electrode layer E1 and on the principal surface 3a. In the electrode portion 5a, the second electrode layer E2 covers the entire first electrode layer E1. In the electrode portion 5a, the second electrode layer E2 is in contact with the entire first electrode layer E1. The second electrode layer E2 included in the electrode portion 5a is in contact with one part of the principal surface 3a. The one part of the principal surface 3a is, for example, the partial region near the end surface 3e, in the principal surface 3a. That is, the one part of the principal surface 3a is close to the end surface 3e. The electrode portion 5a is four-layered on the ridge portion 3g, and is three-layered on the principal surface 3a. The second electrode layer E2 included in the electrode portion 5a is formed to cover the one part of the principal surface 3a and the entire ridge portion 3g. As described above, the one part of the principal surface 3a is, for example, the partial region near the end surface 3e, in the principal surface 3a. The second electrode layer E2 included in the electrode portion 5a indirectly covers the entire ridge portion 3g and the one part of the principal surface 3a in such a manner that the first electrode layer E1 is positioned between the second electrode layer E2 and the element body 3. The second electrode layer E2 included in the electrode portion 5a directly covers the one part of the principal surface 3a. The second electrode layer E2 included in the electrode portion 5a directly covers an entire portion of the first electrode layer E1 formed on the ridge portion 3g. In a case in which the first electrode layer E1 included in the electrode portion 5a is disposed on the principal surface 3a, the electrode portion 5a is four-layered on the principal surface 3a and the ridge portion 3g. The second electrode layer E2 included in the electrode portion 5a includes a portion $E2_{1a}$ positioned on the principal surface 3a. Also in the present modification, in a case in which the first electrode layer E1 included in the electrode portion 5a is disposed on the principal surface 3a, the portion $E2_{1a}$ of the second electrode layer E2 includes a portion being in contact with the principal surface 3a and a portion being in contact with the first electrode layer E1.

The first electrode layer E1 included in the electrode portion 5b is disposed on the ridge portion 3h, and is not disposed on the principal surface 3b. The first electrode layer E1 included in the electrode portion 5b is formed to cover the entire ridge portion 3h. The first electrode layer E1 is not formed on the principal surface 3b. The first electrode layer E1 included in the electrode portion 5b is in contact with the entire ridge portion 3h. The principal surface 3a is not covered with the first electrode layer E1, and is exposed from the first electrode layer E1. Also in the present modification, the first electrode layer E1 included in the electrode portion 5b may be disposed on the principal surface 3b.

The second electrode layer E2 included in the electrode portion 5b is disposed on the first electrode layer E1 and on the principal surface 3b. In the electrode portion 5b, the second electrode layer E2 covers the entire first electrode layer E1. In the electrode portion 5b, the second electrode layer E2 is in contact with the entire first electrode layer E1. The second electrode layer E2 included in the electrode portion 5b is in contact with one part of the principal surface 3b. The one part of the principal surface 3b is, for example, the partial region near the end surface 3e, in the principal surface 3b. That is, the one part of the principal surface 3b is close to the end surface 3e. The electrode portion 5b is four-layered on the ridge portion 3h, and is three-layered on the principal surface 3b. The second electrode layer E2 included in the electrode portion 5b is formed to cover the one part of the principal surface 3b and the entire ridge portion 3h. As described above, the one part of the principal surface 3b is, for example, the partial region near the end surface 3e, in the principal surface 3b. The second electrode layer E2 included in the electrode portion 5b indirectly covers the entire ridge portion 3h and the one part of the principal surface 3b in such a manner that the first electrode layer E1 is positioned between the second electrode layer E2 and the element body 3. The second electrode layer E2 included in the electrode portion 5b directly covers the one part of the principal surface 3b. The second electrode layer E2 included in the electrode portion 5b directly covers an entire portion of the first electrode layer E1 formed on the ridge portion 3h. In a case in which the first electrode layer E1 included in the electrode portion 5b is disposed on the principal surface 3b, the electrode portion 5b is four-layered on the principal surface 3b and the ridge portion 3h. The second electrode layer E2 included in the electrode portion 5b includes a portion $E2_{1b}$ positioned on the principal surface 3b. In the present modification, in a case in which the first electrode layer E1 included in the electrode portion 5b is disposed on the principal surface 3b, the portion $E2_{1b}$ of the second electrode layer E2 includes a portion being in contact with the principal surface 3b and a portion being in contact with the first electrode layer E1.

The first electrode layer E1 included in the electrode portion 5c is disposed on the ridge portion 3i, and is not disposed on the side surface 3c. The first electrode layer E1 included in the electrode portion 5c is formed to cover the entire ridge portion 3i. The first electrode layer E1 is not formed on the side surface 3c. The first electrode layer E1 included in the electrode portion 5c is in contact with the entire ridge portion 3i. The side surface 3c is not covered with the first electrode layer E1, and is exposed from the first electrode layer E1. Also in the present modification, the first electrode layer E1 included in the electrode portion 5c may be disposed on the side surface 3c.

The second electrode layer E2 included in the electrode portion 5c is disposed on the first electrode layer E1 and on the side surface 3c. In the electrode portion 5c, the second electrode layer E2 covers the entire first electrode layer E1. In the electrode portion 5c, the second electrode layer E2 is in contact with the entire first electrode layer E1. The second electrode layer E2 included in the electrode portion 5c is in contact with one part of the side surface 3c. The one part of the side surface 3c is, for example, the partial region near the end surface 3e, in the side surface 3c. That is, the one part of the side surface 3c is close to the end surface 3e. The electrode portion 5c is four-layered on the ridge portion 3i, and is three-layered on the side surface 3c. The second electrode layer E2 included in the electrode portion 5c is formed to cover the one part of the side surface 3c and the entire ridge portion 3i. As described above, the one part of the side surface 3c is, for example, the partial region near the end surface 3e, in the side surface 3c. The second electrode layer E2 included in the electrode portion 5c indirectly covers the entire ridge portion 3i in such a manner that the first electrode layer E1 is positioned between the second electrode layer E2 and the element body 3. The second electrode layer E2 included in the electrode portion 5c directly covers the one part of the side surface 3c. The second electrode layer E2 included in the electrode portion 5c directly covers an entire portion of the first electrode layer E1 formed on the ridge portion 3i. In a case in which the first electrode layer E1 included in the electrode portion 5c is disposed on the side surface 3c, the electrode portion 5c is four-layered on the side surface 3c and the ridge portion 3i. The second electrode layer E2 included in the electrode portion 5c includes a portion $E2_2$ positioned on the side surface 3c. Also in the present modification, in a case in which the first electrode layer E1 included in the electrode portion 5c is disposed on the side surface 3c, the portion $E2_2$ of the second electrode layer E2 includes a portion being in contact with the side surface 3c and a portion being in contact with the first electrode layer E1.

The first electrode layer E1 included in the electrode portion 5e is disposed on the end surface 3e. The end surface 3e is entirely covered with the first electrode layer E1. The first electrode layer E1 included in the electrode portion 5e is in contact with the entire end surface 3e. The second electrode layer E2 included in the electrode portion 5e is disposed on the first electrode layer E1. In the electrode portion 5e, the second electrode layer E2 is in contact with the entire first electrode layer E1. The second electrode layer E2 included in the electrode portion 5e is formed to cover the entire end surface 3e. The second electrode layer E2 included in the electrode portion 5e indirectly covers the entire end surface 3e in such a manner that the first electrode layer E1 is positioned between the second electrode layer E2 and the end surface 3e. The second electrode layer E2 included in the electrode portion 5e directly covers the entire first electrode layer E1. In the electrode portion 5e, the first electrode layer E1 is formed on the end surface 3e to be coupled to the one ends of the corresponding internal electrodes 7 or 9. The second electrode layer E2 included in the electrode portion 5e includes a portion $E2_3$ positioned on the end surface 3e.

As illustrated in FIGS. 14 and 15, in the present modification, a maximum thickness T1 of each of the portions $E2_{1a}$ and $E2_{1b}$ of the second electrode layer E2 is larger than a maximum thickness T2 of the portion $E2_2$ of the second electrode layer E2. As illustrated in FIG. 14, the maximum thickness T1 of the second electrode layer E2 is larger than a maximum thickness T3 of the portion $E2_3$ of the second electrode layer E2. For example, in a case in which each of the portions $E2_{1a}$ and $E2_{1b}$ of the second electrode layer E2 constitutes the first portion, the portion $E2_3$ of the second electrode layer E2 constitutes the second portion. For example, in a case in which each of the portions $E2_{1a}$ and $E2_{1b}$ of the second electrode layer E2 constitutes the first portion, the portion $E2_2$ of the second electrode layer E2 constitutes the second portion. FIGS. 14 and 15 do not illustrate the internal electrodes 7 and 9.

In the second electrode layer E2, the plurality of gaps 13 exists as illustrated in FIGS. 12 to 15. In the cross-section along the thickness direction of the second electrode layer E2, a maximum length of the gap 13 is in the range of 1 to 20 µm. In the present modification, the maximum length of the gap 13 is 20 µm.

The plating layer PL includes a portion PL1a located on the portion $E2_{1a}$, a portion PL1b located on the portion $E2_{1b}$, a portion PL2 located on the portion $E2_2$, and a portion PL3 located on the portion $E2_3$. The portion PL1a includes an end edge PL1ea. The portion PL1b includes an end edge PL1eb. The portion PL2 includes an end edge PL2e. Also in the present modification, the portion PL3 includes no end edge. As illustrated in FIG. 14, a clearance 17 exists between the end edge PL1ea and the element body 3 (principal surface 3a). A clearance 18 exists between the end edge PL1eb and the element body 3 (principal surface 3b). As illustrated in FIG. 15, a clearance 19 exists between the end edge PL2e and the element body 3 (side surface 3c). Each width of the clearances 17, 18 and 19 is, for example, larger than 0 and equal to or smaller than 3 µm. The width of each of the clearances 17, 18, and 19 may be the same. The width of each of the clearances 17, 18, and 19 may be different.

The second electrode layer E2 includes the portion $E2_{1a}$, the portion $E2_{1b}$, the portion $E2_2$, and the portion $E2_3$ as described above. An existence ratio of the gaps 13 in each of the portions $E2_{1a}$ and $E2_{1b}$ of the second electrode layer E2 is greater than an existence ratio of the gaps 13 in the portion $E2_2$ of the second electrode layer E2. The existence ratio of the gaps 13 in each of the portions $E2_{1a}$ and $E2_{1b}$ of the second electrode layer E2 is greater than an existence ratio of the gaps 13 in the portion $E2_3$ of the second electrode layer E2. Also in the present modification, the existence ratio of the gaps 13 is a ratio of the total area of the gaps 13 to an area of the second electrode layer E2 in a cross-section along a thickness direction of the second electrode layer E2. Also in the present modification, the thickness direction of the second electrode layer E2 coincides with the direction orthogonal to the principal surface 3a in portions $E2_{1a}$ and $E2_{1b}$, coincides with the direction orthogonal to the side surface 3c in the portion $E2_2$, and coincides with the direction orthogonal to the end surface 3e in the portion $E2_3$. The thickness direction of the second electrode layer E2 coincides with the first direction D1 in the portions $E2_{1a}$ and $E2_{1b}$, coincides with the second direction D2 in the portion $E2_2$, and coincides with the third direction D3 in the portion $E2_3$.

The existence ratio of the gaps 13 in the portions $E2_{1a}$ of the second electrode layer E2 is a value obtained by, for example, dividing the total area of the gaps 13 existing in the portion $E2_{1a}$ in the cross-section along the thickness direction of the second electrode layer E2 (portion $E2_{1a}$) by the area of the portion $E2_{1a}$ and expressed in percentage, in a similar manner to the existence ratio of the gaps 13 in the portions $E2_1$. The existence ratio of the gaps 13 in the portions $E2_{1b}$ of the second electrode layer E2 is a value obtained by, for example, dividing the total area of the gaps 13 existing in the portion $E2_{1b}$ in the cross-section along the thickness direction of the second electrode layer E2 (portion $E2_{1b}$) by the area of the portion $E2_{1b}$ and expressed in percentage. The existence ratio of the gaps 13 in each of the portions $E2_{1a}$ and $E2_{1b}$ is within the range of 5 to 35%. In the present modification, the total area of the gaps 13 existing in each of the portions $E2_{1a}$ and $E2_{1b}$ is 500 to 21000 µm². The area of each of the portions $E2_{1a}$ and $E2_{1b}$ is 0.010 to 0.060 mm². For example, the total area of the gaps 13 existing in each of the portions $E2_{1a}$ and $E2_{1b}$ is 7000 µm², and the area of each of the portions $E2_{1a}$ and $E2_{1b}$ is 0.035 mm². In this case, the existence ratio of the gaps 13 in each of the portions $E2_{1a}$ and $E2_{1b}$ is 20%. The area of the portion $E2_{1a}$ is the area of a region defined by the surface of the first electrode layer E1 and the surface of the second electrode layer E2 in the portion $E2_{1a}$. The area of the portion $E2_{1b}$ is the area of a region defined by the surface of the first electrode layer E1 and the surface of the second electrode layer E2 in the portion $E2_{1b}$. The area of the portion $E2_{1a}$ includes the total area of the gaps 13 existing in the portion $E2_{1a}$. The area of the portion $E2_{1b}$ includes the total area of the gaps 13 existing in the portion $E2_{1b}$.

The existence ratio of the gaps 13 in the portion $E2_2$ of the second electrode layer E2 is a value obtained by, for example, dividing the total area of the gaps 13 existing in the portion $E2_2$ in the cross-section along the thickness direction of the second electrode layer E2 (portion $E2_2$) by the area of the portion $E2_2$ and expressed in percentage. The existence ratio of the gaps 13 in the portion $E2_2$ is within the range of 5 to 35%. In the present modification, the total area of the gaps 13 existing in the portion $E2_2$ is 300 to 12600 µm². The area of the portion $E2_2$ is 0.006 to 0.036 mm². For example, the total area of the gaps 13 existing in the portion $E2_2$ is 2100 µm², and the area of the portion $E2_2$ is 0.021 mm². In this case, the existence ratio of the gaps 13 in the portion $E2_2$ is 10%. The existence ratio of the gaps 13 in the portion $E2_2$ may be, for example, equal to the existence ratio of the gaps 13 in each of the portions $E2_{1a}$ and $E2_{1b}$. The existence ratio of the gaps 13 in the portion $E2_2$ may be, for example, 20%. In this case, for example, the total area of the gaps 13 existing in the portion $E2_2$ is 500 to 21000 µm² and the area of the portion $E2_2$ is 0.010 to 0.060 mm². For example, the total area of the gaps 13 existing in the portion $E2_2$ is 7000 µm², and the area of the portion $E2_2$ is 0.035 mm². The area of the portion $E2_2$ is the area of a region defined by the surface of the first electrode layer E1 and the surface of the second electrode layer E2 in the portion $E2_2$. The area of the portion $E2_2$ includes the total area of the gaps 13 existing in the portion $E2_2$.

The existence ratio of the gaps 13 in the portion $E2_3$ of the second electrode layer E2 is a value obtained by, for example, dividing the total area of the gaps 13 existing in the portion $E2_3$ in the cross-section along the thickness direction of the second electrode layer E2 (portion $E2_3$) by the area of the portion $E2_3$ and expressed in percentage. The existence ratio of the gaps 13 in the portion $E2_3$ is within the range of 5 to 35%. In the present modification, the total area of the gaps 13 existing in the portion $E2_3$ is 1000 to 70000 μm². The area of the portion $E2_3$ is 0.02 to 0.20 mm². For example, the total area of the gaps 13 existing in the portion $E2_3$ is 10000 μm², and the area of the portion $E2_3$ is 0.01 mm². In this case, the existence ratio of the gaps 13 in the portion $E2_3$ is 10%. The area of the portion $E2_3$ is the area of a region defined by the surface of the first electrode layer E1 and the surface of the second electrode layer E2 in the portion $E2_3$. The area of the portion $E2_3$ includes the total area of the gaps 13 existing in the portion $E2_3$.

The maximum length of the gap 13 can be obtained by the same procedure as in the above-described embodiment. The total area of the gaps 13 in each of the portions $E2_{1a}$, $E2_{1b}$, $E2_2$, and $E2_3$ can be obtained by the same procedure as in the above-described embodiment. The area of the second electrode layer E2 in each of the portions $E2_{1a}$, $E2_{1b}$, $E2_2$, and $E2_3$ can be obtained by the same procedure as in the above-described embodiment.

As described above, in the present modification, even in the case in which moisture absorbed in the resin contained in the second electrode layer E2 is gasified when the multilayer capacitor C2 is solder-mounted, gas generated from the moisture reaches the clearances 17, 18, and 19 from the plurality of gaps 13. The gas reaching the clearances 17, 18, and 19 moves out of the external electrode 5. Therefore, stress tends not to act on the second electrode layer E2. Consequently, the multilayer capacitor C2 suppresses peel-off of the second electrode layer E2.

In the multilayer capacitor C2, the existence ratio of the gaps 13 in each of the portions $E2_{1a}$ and $E2_{1b}$ of the second electrode layer E2 is greater than the existence ratio of the gaps 13 in the portion $E2_3$ of the second electrode layer E2. Therefore, the gas generated from the moisture in the second electrode layer E2 tends to move out of the external electrode 5 through the clearance 17 between the end edge PL1ea and the element body 3. The gas generated from the moisture in the second electrode layer E2 tends to move out of the external electrode 5 through the clearance 18 between the end edge PL1eb and the element body 3. The gas generated in the portion $E2_3$ tends to reach the portion $E2_{1a}$ or the portion $E2_{1b}$ through a passage constituted by the plurality of gaps 13. As described above, the gas reaching the portion $E2_{1a}$ moves out of the external electrode 5 through the clearance 17. As described above, the gas reaching the portion $E2_{1b}$ moves out of the external electrode 5 through the clearance 18. Consequently, the multilayer capacitor C2 controls the position where the gas exits, in a similar manner to the multilayer capacitor C1.

In the multilayer capacitor C2, the existence ratio of the gaps 13 in each of the portions $E2_{1a}$ and $E2_{1b}$ of the second electrode layer E2 is greater than the existence ratio of the gaps 13 in the portion $E2_2$ of the second electrode layer E2. Therefore, the gas generated from the moisture in the second electrode layer E2 tends to move out of the external electrode 5 through the clearance 17 between the end edge PL1ea and the element body 3. The gas generated from the moisture in the second electrode layer E2 tends to move out of the external electrode 5 through the clearance 18 between the end edge PL1eb and the element body 3. The gas tends not to move from the clearance 19 between the end edge PL2e and the element body 3. Consequently, the multilayer capacitor C2 reliably controls the position where the gas exits, in a similar manner to the multilayer capacitor C1.

In the multilayer capacitor C2, the gas generated in the portion $E2_3$ tends to reach the portion $E2_{1a}$ or the portion $E2_{1b}$ as described above. Therefore, the gas generated in the portion $E2_3$ moves out of the external electrode 5 from the portion $E2_{1a}$ or $E2_{1b}$ through the clearance 17 or 18. Consequently, the multilayer capacitor C2 controls occurrence of the solder splattering, in a similar manner to the multilayer capacitor C1.

The gas generated in the second electrode layer E2 provided in the electrode portion 5c tends to reach the second electrode layer E2 provided in the electrode portion 5a through the passage formed by the plurality of gaps 13. The gas reaching the second electrode layer E2 provided in the electrode portion 5a moves out of the external electrode 5 through the clearance 17 or the clearance 18 as described above.

In the multilayer capacitor C2, the maximum thickness T1 of each the portions $E2_{1a}$ and $E2_{1b}$ is larger than the maximum thickness T3 of the portion $E2_3$. Therefore, the stress the stress further tends not to act on the second electrode layer E2 also in the multilayer capacitor C2, and the multilayer capacitor C2 further suppresses the peel-off of the second electrode layer E2.

In the multilayer capacitor C2, the maximum thickness T1 of each the portions $E2_{1a}$ and $E2_{1b}$ is larger than the maximum thickness T2 of the portion $E2_2$. Therefore, the stress further tends not to act on the second electrode layer E2 in the multilayer capacitor C2, and the multilayer capacitor C2 further suppresses the peel-off of the second electrode layer E2, in a similar manner to the multilayer capacitor C1.

In the multilayer capacitor C2, the total area of the gaps 13 in the portion $E2_{1a}$ is within the range of 5 to 35% of the area of the portion $E2_{1a}$ in the cross-section along the thickness direction of the portion $E2_{1a}$ of the second electrode layer E2. The total area of the gaps 13 in the portion $E2_{1b}$ is within the range of 5 to 35% of the area of the portion $E2_{1b}$ in the cross-section along the thickness direction of the portion $E2_{1b}$ of the second electrode layer E2. Therefore, the multilayer capacitor C2 controls an increase in the gas generation amount and reduces inhibition of gas movement in each of the portions $E2_{1a}$ and $E2_{1b}$, in a similar manner to the multilayer capacitor C1.

In the multilayer capacitor C2, the side surface 3c is arranged to constitute the mounting surface.

In a case in which the gas generated from the moisture in the second electrode layer E2 moves out of the external electrode 5 through the clearance 17 and the clearance 18, a posture of the multilayer capacitor C2 may change during solder-mounting due to ejection of the gas from the external electrode 5. In a case in which the posture of the multilayer capacitor C2 changes, a mounting failure of the multilayer capacitor C2 may occur.

In a case in which the existence ratio of the gaps 13 in each of the portions $E2_{1a}$ and $E2_{1b}$ is greater than the existence ratio of the gaps 13 in the portion $E2_2$, the gas moves out of the external electrode 5 mainly through the clearance 17 and the clearance 18 as described above. The gas hardly moves out of the external electrode 5 through the clearance 19. Therefore, the multilayer capacitor C2 controls occurrence of the mounting failure of the multilayer capacitor C2.

Since the electrode portion 5c includes the second electrode layer E2, the external force applied onto the multilayer capacitor C2 from the electronic device tends not to act on the element body 3. Therefore, the multilayer capacitor C2 controls occurrence of the crack in the element body 3.

In the multilayer capacitor C2, the maximum length of each of the plurality of gaps 13 is within the range of 1 to 20 μm in the cross-section along the thickness direction of the second electrode layer E2. Therefore, the multilayer capacitor C2 reliably controls the increase in the gas generation amount and reliably reduces the inhibition of the gas movement in the second electrode layer E2, in a similar manner to the multilayer capacitor C1.

Each of the multilayer capacitors C1 and C2 includes the element body 3 and the external electrode 5 disposed on the element body 3. The external electrode 5 includes the second electrode layer E2 in which the plurality of gaps 13 exists, and the plating layer PL disposed on the second electrode layer E2. In the multilayer capacitor C1, each of the clearances 17 and 19 communicating with the plurality of gaps 13 exists between each of the end edges PL1e and PL2e of the plating layer PL and the element body 3. In the multilayer capacitor C2, each of the clearances 17, 18, and 19 communicating with the plurality of gaps 13 exists between each of the end edges PL1ea, PL1eb, and PL2e of the plating layer PL and the element body 3.

Even in the case in which the moisture absorbed in the resin contained in the second electrode layer E2 is gasified when the multilayer capacitor C1 is solder-mounted, the gas generated from the moisture reaches the clearances 17 and 19 from the plurality of gaps 13. The gas reaching the clearances 17 and 19 moves out of the external electrode 5, and the stress tends not to act on the second electrode layer E2. Consequently, the multilayer capacitor C1 suppresses the peel-off of the second electrode layer E2.

Even in the case where the moisture absorbed in the resin contained in the second electrode layer E2 is gasified when the multilayer capacitor C2 is solder-mounted, the gas generated from the moisture reaches the clearances 17, 18, and 19 from the plurality of gaps 13. The gas reaching the clearances 17, 18, and 19 moves out of the external electrode 5, and the stress tends not to act on the second electrode layer E2. Consequently, the multilayer capacitor C2 suppresses the peel-off of the second electrode layer E2.

In the present specification, in a case in which an element is described as being disposed on another element, the element may be directly disposed on the other element or be indirectly disposed on the other element. In a case in which an element is indirectly disposed on another element, an intervening element is present between the element and the other element. In a case in which an element is directly disposed on another element, no intervening element is present between the element and the other element.

In the present specification, in a case in which an element is described as being positioned on another element, the element may be directly positioned on the other element or be indirectly positioned on the other element. In a case in which an element is indirectly positioned on another element, an intervening element is present between the element and the other element. In a case in which an element is directly positioned on another element, no intervening element is present between the element and the other element.

In the present specification, in a case in which an element is described as covering another element, the element may directly cover the other element or indirectly cover the other element. In a case in which an element indirectly covers another element, an intervening element is present between the element and the other element. In a case in which an element directly covers another element, no intervening element is present between the element and the other element.

Although the embodiment and modification of the present invention have been described above, the present invention is not necessarily limited to the embodiment and modification, and the embodiment can be variously changed without departing from the scope of the invention.

The existence ratio of the gaps 13 in the portion $E2_3$ of the second electrode layer E2 may be equal to or greater than the existence ratio of the gaps 13 in each of the portions $E2_1$, $E2_{1a}$, and $E2_{1b}$ of the second electrode layer E2. In a case in which the existence ratio of the gap 13 in the portion $E2_3$ is less than the existence ratio of the gap 13 in each of the portions $E2_1$, $E2_{1a}$, and $E2_{1b}$, the multilayer capacitors C1 and C2 reliably control the position where the gas exits as described above.

The existence ratio of the gaps 13 in the portion $E2_2$ of the second electrode layer E2 may be equal to or greater than the existence ratio of the gaps 13 in each of the portions $E2_1$, $E2_{1a}$, and $E2_{1b}$ of the second electrode layer E2. In a case in which the existence ratio of the gap 13 in the portion $E2_2$ is less than the existence ratio of the gap 13 in each of the portions $E2_1$, $E2_{1a}$, and $E2_{1b}$, the multilayer capacitors C1 and C2 reliably control the position where the gas exits as described above.

The maximum thickness T1 of each of the portions $E2_1$, $E2_{1a}$, and $E2_{1b}$ may be equal to or smaller than the maximum thickness T2 of the portion $E2_2$. In a case in which the maximum thickness T1 of each of the portions $E2_1$, $E2_{1a}$, and $E2_{1b}$ is larger than the maximum thickness T2 of the portion $E2_2$, the stress further tends not to act on the second electrode layer E2 in the multilayer capacitors C1 and C2, and the multilayer capacitors C1 and C2 further suppress the peel-off of the second electrode layer E2, as described above.

The maximum thickness T1 of each of the portions $E2_1$, $E2_{1a}$, and $E2_{1b}$ may be equal to or smaller than the maximum thickness T3 of the portion $E2_3$. In a case in which the maximum thickness T1 of each of the portions $E2_1$, $E2_{1a}$, and $E2_{1b}$ is larger than the maximum thickness T3 of the portion $E2_3$, the stress further tends not to act on the second electrode layer E2 in the multilayer capacitors C1 and C2, and the multilayer capacitors C1 and C2 further suppress the peel-off of the second electrode layer E2, as described above.

The maximum thickness T1 of the portion $E2_{1a}$ and the maximum thickness T1 of the portion $E2_{1b}$ may be the same. The maximum thickness T1 of the portion $E2_{1a}$ and the maximum thickness T1 of the portion $E2_{1b}$ may be different.

In the cross-section along the thickness direction of each of the portions $E2_1$, $E2_{1a}$, and $E2_{1b}$ of the second electrode layer E2, the total area of the gaps 13 in each of the portions $E2_1$, $E2_{1a}$, and $E2_{1b}$ may be outside the range of 5 to 35% of the area of each of the portions $E2_1$, $E2_{1a}$, and $E2_{1b}$. In a case in which the total area of the gaps 13 in each of the portions $E2_1$, $E2_{1a}$, and $E2_{1b}$ is within the range of 5 to 35% of the area of each of the portions $E2_1$, $E2_{1a}$, and $E2_{1b}$ in the cross-section along the thickness direction of each of the portions $E2_1$, $E2_{1a}$, and $E2_{1b}$, the multilayer capacitors C1 and C2 control the increase in the gas generation amount and reduce the inhibition of the gas movement in each of the portions $E2_1$, $E2_{1a}$, and $E2_{1b}$, as described above.

The area of the portion $E2_1$ of the second electrode layer E2 may be equal to or larger than the area of the portion $E2_2$ of the second electrode layer E2. In a case in which the area of the portion $E2_1$ of the second electrode layer E2 is larger than the area of the portion $E2_2$ of the second electrode layer E2, the multilayer capacitor C1 more reliably controls the occurrence of the crack in the element body 3, as described above.

In the cross-section along the thickness direction of the second electrode layer E2, the maximum length of each of the plurality of gaps 13 may be outside the range of 1 to 20 μm. In a case in which the maximum length of each of the plurality of gaps 13 is within the range of 1 to 20 μm in the cross-section along the thickness direction of the second electrode layer E2, the multilayer capacitors C1 and C2 reliably control the increase in the gas generation amount and reliably reduce the inhibition of the gas movement in the second electrode layer E2, as described above.

In the multilayer capacitor C2, the principal surface 3a or the principal surface 3b may be arranged to constitute the mounting surface.

Since the portion $E2_{1a}$ is located on the principal surface 3a and the portion $E2_{1b}$ is located on the principal surface 3b also in the multilayer capacitor C2, the external force applied onto the multilayer capacitor C2 from the electronic device tends not to act on the element body 3. In a case in which the existence ratio of the gaps in each of the portions $E2_{1a}$ and $E2_{1b}$ is greater than the existence ratio of the gaps in the portion $E2_3$, each of the portions $E2_{1a}$ and $E2_{1b}$ tends to mitigate the external force applied onto the element body 3 as compared with the portion $E2_3$. Therefore, the multilayer capacitor C2 reliably controls occurrence of the crack in the element body 3.

The electronic components of the present embodiment and modification are the multilayer capacitors C1 and C2. Applicable electronic component is not limited to the multilayer capacitor. Examples of the applicable electronic components include, but not limited to, multilayer electronic components such as a multilayer inductor, a multilayer varistor, a multilayer piezoelectric actuator, a multilayer thermistor, or a multilayer composite component, and electronic components other than the multilayer electronic components.

What is claimed is:

1. An electronic component comprising:
   an element body including a plurality of side surfaces adjacent to each other; and
   an external electrode disposed on the plurality of side surfaces, wherein
   the external electrode includes a conductive resin layer in which a plurality of gaps exists and a plating layer disposed on the conductive resin layer,
   a clearance communicating with the plurality of gaps exists between an end edge of the plating layer and the element body,
   the conductive resin layer includes a first portion located on one side surface of the plurality of side surfaces and a second portion located on another side surface of the plurality of side surfaces, and
   an existence ratio of the gaps in the first portion is greater than an existence ratio of the gaps in the second portion.

2. The electronic component according to claim 1, wherein
   a maximum thickness of the first portion is larger than a maximum thickness of the second portion.

3. The electronic component according to claim 1, wherein
   a total area of the gaps in the first portion is within a range of 5 to 35% of an area of the first portion in a cross-section along a thickness direction of the first portion.

4. The electronic component according to claim 1, wherein
   the one side surface is arranged to constitute a mounting surface.

5. The electronic component according to claim 1, wherein
   the other side surface is arranged to constitute a mounting surface.

6. The electronic component according to claim 1, wherein
   the element body includes an end surface adjacent to the plurality of side surfaces,
   the conductive resin layer is formed to continuously cover a part of each of the plurality of side surfaces and a part of the end surface, and
   the plating layer is formed to cover the entire end surface.

7. The electronic component according to claim 1, wherein
   the element body includes an end surface adjacent to the plurality of side surfaces,
   the one side surface is arranged to constitute a mounting surface,
   the conductive resin layer is formed to continuously cover a part of each of the plurality of side surfaces and a part of the end surface,
   the plating layer is formed to cover the entire end surface, and
   an area of the first portion is larger than an area of the second portion.

8. The electronic component according to claim 1, wherein
   a maximum length of each of the plurality of gaps is within a range of 1 to 20 μm in a cross-section along a thickness direction of the conductive resin layer.

9. An electronic component comprising:
   an element body; and
   an external electrode disposed on the element body, wherein
   the external electrode includes a conductive resin layer in which a plurality of gaps exists and a plating layer disposed on the conductive resin layer, and
   a clearance communicating with the plurality of gaps exists between an end edge of the plating layer and the element body.

10. An electronic component comprising:
    an element body including a side surface and an end surface adjacent to each other; and
    an external electrode disposed on the side surface and the end surface, wherein
    the external electrode includes a conductive resin layer in which a plurality of gaps exists and a plating layer disposed on the conductive resin layer,
    a clearance communicating with the plurality of gaps exists between an end edge of the plating layer and the element body,
    the conductive resin layer includes a first portion located on the side surface and a second portion located on the end surface, and
    an existence ratio of the gaps in the first portion is greater than an existence ratio of the gaps in the second portion.

11. The electronic component according to claim 10, wherein
    a maximum thickness of the first portion is larger than a maximum thickness of the second portion.

12. The electronic component according to claim 10, wherein
    a total area of the gaps in the first portion is within a range of 5 to 35% of an area of the first portion in a cross-section along a thickness direction of the first portion.

13. The electronic component according to claim 10, wherein the side surface is arranged to constitute a mounting surface.

14. The electronic component according to claim 10, wherein the conductive resin layer is formed to continuously cover a part of the side surface and a part of the end surface, and the plating layer is formed to cover the entire end surface.

15. The electronic component according to claim 10, wherein a maximum length of each of the plurality of gaps is within a range of 1 to 20 µm in a cross-section along a thickness direction of the conductive resin layer.

* * * * *